(12) United States Patent
Swager et al.

(10) Patent No.: US 7,671,166 B2
(45) Date of Patent: Mar. 2, 2010

(54) HIGH INTERNAL FREE VOLUME COMPOSITIONS FOR LOW-K DIELECTRIC AND OTHER APPLICATIONS

(75) Inventors: Timothy M. Swager, Newton, MA (US); Jean Bouffard, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 133 days.

(21) Appl. No.: 11/336,417

(22) Filed: Jan. 20, 2006

(65) Prior Publication Data

US 2007/0117954 A1   May 24, 2007

Related U.S. Application Data

(60) Provisional application No. 60/739,060, filed on Nov. 22, 2005, provisional application No. 60/739,586, filed on Nov. 25, 2005.

(51) Int. Cl.
*C08G 65/38* (2006.01)
*C08G 61/02* (2006.01)

(52) U.S. Cl. .................. 528/210; 528/86; 528/219

(58) Field of Classification Search .................. 528/86, 528/210, 219
See application file for complete search history.

(56) References Cited

U.S. PATENT DOCUMENTS

| | | | | |
|---|---|---|---|---|
| 3,242,186 A | * | 3/1966 | Dershowitz | ................. 546/285 |
| 3,785,813 A | * | 1/1974 | Rickter | ........................ 430/219 |
| 4,539,507 A | * | 9/1985 | VanSlyke et al. | ............ 313/504 |
| 6,124,421 A | | 9/2000 | Lau et al. | |
| 6,303,733 B1 | | 10/2001 | Lau et al. | |
| 6,469,123 B1 | * | 10/2002 | Lau et al. | ....................... 528/86 |
| 6,509,110 B1 | * | 1/2003 | Salbeck et al. | ............... 428/690 |
| 6,605,693 B1 | * | 8/2003 | Becker et al. | ................ 528/378 |
| 6,660,820 B1 | | 12/2003 | Martin et al. | |
| 6,783,814 B2 | | 8/2004 | Swager et al. | |
| 6,828,450 B2 | * | 12/2004 | Hua et al. | ................... 552/296 |
| 7,041,910 B2 | | 5/2006 | Swager et al. | |
| 7,250,519 B2 | * | 7/2007 | Stossel et al. | ................ 564/404 |
| 2002/0040805 A1 | | 4/2002 | Swager et al | |
| 2002/0150697 A1 | * | 10/2002 | Swager et al. | ................. 428/1.1 |
| 2003/0134959 A1 | * | 7/2003 | Hancock et al. | ............. 524/492 |
| 2003/0178607 A1 | | 9/2003 | Swager et al. | |
| 2004/0106741 A1 | * | 6/2004 | Kriesel et al. | ............ 525/329.5 |

(Continued)

OTHER PUBLICATIONS

Amara, J. et al., "Incorporation of Internal Free Volume: Synthesis and Characterization of Iptycene-Elaborated Poly(butadiene)s," *Macromolecules* 2004, 37, 3068-3070.

(Continued)

*Primary Examiner*—Mark Eashoo
*Assistant Examiner*—Liam J Heincer
(74) *Attorney, Agent, or Firm*—Wolf, Greenfield & Sacks, P.C.

(57) ABSTRACT

The present invention provides materials, devices, and methods involving new heterocyclic, shape-persistent monomeric units with internal free volume. In some cases, materials the present invention may comprise monomers, oligomers, or polymers that incorporate a heterocyclic, shape-persistent iptycene. The present invention may provide materials having low dielectric constants and improved stability at high operating temperatures due to the electron-poor character of materials. In addition, compositions of the invention may be easily synthesized and readily modified to suit a particular application.

16 Claims, 8 Drawing Sheets

U.S. PATENT DOCUMENTS

| | | | |
|---|---|---|---|
| 2004/0116650 A1 | 6/2004 | Swager et al. | |
| 2004/0170775 A1* | 9/2004 | Swager et al. | 428/1.1 |
| 2004/0254388 A1* | 12/2004 | Spreitzer et al. | 554/8 |
| 2005/0054854 A1* | 3/2005 | Stossel et al. | 546/208 |
| 2005/0196775 A1* | 9/2005 | Swager et al. | 435/6 |
| 2005/0263758 A1* | 12/2005 | Treacher et al. | 257/40 |
| 2006/0058524 A1* | 3/2006 | Falcou et al. | 544/294 |
| 2006/0073607 A1* | 4/2006 | Rose et al. | 436/166 |
| 2006/0270846 A1* | 11/2006 | Karpishin et al. | 540/455 |
| 2007/0081921 A1* | 4/2007 | Swager et al. | 422/82.05 |

OTHER PUBLICATIONS

Garner, C., et al., "Challenges for dielectric materials in future integrated circuit technologies," *Microelectronics Reliability* 2005, 45, 919-924.

Havemann, R., "High-Performance Interconnects: An Integration Overview," *Proceedings of the IEEE* 2001, 89(5), 586.

Long, T. et al., "Molecular Design of Free Volume as a Route to Low-κ Dielectric Materials," *J. Am. Chem. Soc.* 2003, 125, 14113-14119.

Maex, K. et al., "Low dielectric constant materials for microelectronics," *Journal of Applied Physics* 2003, 93(11), 149.

Maier, G., "Low dielectric constant polymers for microelectronics," *Prog. Polym. Sci.* 2001, 26, 3-65.

Martin, S. et al., "Development of a Low-Dielectric-Constant Polymer for the Fabrication of Integrated Circuit Interconnect," *Adv. Mater.* 2000, 12(23), 1769.

Morgen, M., et al., "Low Dielectric Constant Materials for ULSI Interconnects," *Annu. Rev. Mater. Sci.* 2000, 30, 645.

Murarka, S., "Materials aspects of copper interconnection technology for semiconductor applications," *Materials Science and Technology* 2001, 17, 749.

Okamoto, I. et al., "Orbital Unsymmetrization Affects Facial Selectivities of Diels-Alder Dienophiles," *J. Org. Chem.* 1996, 61, 3155-3166.

Shamiryan, D. et al., "Low-k dielectric materials," *Materials Today*, Jan. 2004.

Smet, M. et al., "Synthesis of the Formal Diels-Alder Adducts of N-substituted Dehydromaleimides and Anthracene," *Molecules* 2000, 5, 179-181.

Treichel, H. et al., "Integration Challenges for Low Dielectric Constant Materials," *Advanced Engineering Materials* 2001, 7, 3.

International Search Report dated Sep. 24, 2007 in International Application No. PCT/US2006/45390.

Dijkstra et al., "Shape-Persistent Nanosize Organometallic Complexes: Synthesis and Application in a Nanofiltration Membrane Reactor," J. Org. Chem., 2003, vol. 68, No. 3, pp. 675-685.

* cited by examiner a.)

b.)

c.)

d.)

HIGH INTERNAL FREE VOLUME COMPOSITIONS FOR LOW-K DIELECTRIC AND OTHER APPLICATIONS

RELATED APPLICATIONS

This application claims the benefit of U.S. Provisional Patent Application Ser. No. 60/739,060, filed Nov. 22, 2005, entitled "High Internal Free Volume Compositions for Low-K Dielectric and Other Applications," by Timothy Swager, et al., and U.S. Provisional Patent Application Ser. No. 60/739,586, filed Nov. 25, 2005, entitled "High Internal Free Volume Compositions for Low-K Dielectric and Other Applications," by Timothy Swager, et al., the entirety of which are incorporated herein by reference.

FEDERALLY SPONSORED RESEARCH

This invention was made with government support under awarded by the National Science Foundation under Grant Number DMR-0314421 and by NASA under Grant No. NAS2-02056. The government has certain rights in the invention.

FIELD OF THE INVENTION

The present invention relates generally to materials, devices, and methods that may incorporate heterocyclic, shape-persistent molecules, such as iptycenes.

BACKGROUND OF THE INVENTION

Certain classes of polymers having low dielectric constants can maintain their mechanical properties at exceptionally high temperatures, making them attractive for use in high-performance engineering thermoplastics. For example, polymers of the poly(aryl ether) family have been widely used, among other polymers incorporating the aryl ether subunit (polyetheretherketone, polysulphone, polyethersulphone, polyphenylene oxide, etc.), as dielectric coatings in the microelectronics industry due to their thermal and mechanical stability at high temperatures, as well as their relatively low dielectric constant (2.2-3.0).

Among the materials that may exhibit low dielectric constants may be fluorinated, organic polymers. However, fluorinated organic polymers may exhibit limited solubility, processability, and poor mechanical properties at elevated temperatures. For example, some fluorinated organic polymers have been shown to decompose at high temperatures, resulting in the release of corrosive gases, such as hydrogen fluoride or fluorine. Another approach for the lowering of the dielectric constant of materials may be the incorporation of pores in the dielectric material. While incorporation of pores within, for example, an organic polymer can lower the overall dielectric constant, the control of the porosity at a microscopic level may be difficult.

The incorporation of micropores has been shown to affect the mechanical properties of the coating. Previous work has shown that the incorporation of internal free volume at the molecular level by the use of rigid bicyclic scaffold that prevent the close-packing of adjacent polymer chains may also produce a material having a low dielectric constant without exhibiting some of the drawbacks associated with microporous structures. For example, poly(aryl ether)s obtained by the condensation of triptycene hydroquinones and decafluorobiphenyl were found to have low dielectric constant and promising thermomechanical properties. However, such materials may be difficult and costly to synthesize.

Accordingly, improved methods are needed.

SUMMARY OF THE INVENTION

The present invention relates compositions comprising polymers comprising a shape-persistent molecule having at least 20% free volume, wherein the shape-persistent molecule comprises at least two heteroatoms.

The present invention also relates to compositions comprising polymers comprising an iptycene, wherein the iptycene comprises an aromatic ring comprising at least one heteroatom.

The present invention also relates to compositions comprising poly(aryl ether)s comprising a shape-persistent molecule comprising a heteroatom.

The present invention provides compositions comprising a compound comprising the structure,

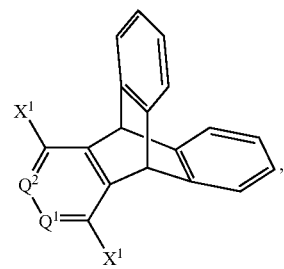

wherein $X^1$ and $X^2$ can be the same or different and are leaving groups, and $Q^1$ and $Q^2$ can be the same or different and are heteroatoms. The present invention also provides compositions comprising a compound comprising the structure,

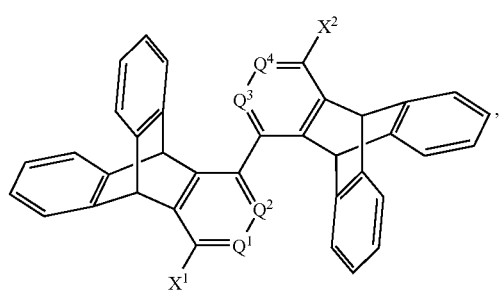

wherein $X^1$ and $X^2$ can be the same or different and are leaving groups, and $Q^1$, $Q^2$, $Q^3$ and $Q^4$ can be the same or different and are heteroatoms. Another aspect of the present invention provides methods for synthesizing polymers or oligomers, comprising reacting at least one monomeric species with a compound having the structure,

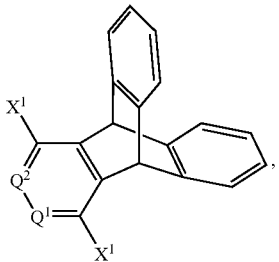

to produce a polymer or oligomer, wherein $X^1$ and $X^2$ can be the same or different and are leaving groups, and $Q^1$ and $Q^2$ can be the same or different and are heteroatoms.

The present invention also provide methods synthesizing polymers or oligomers comprising reacting at least one monomeric species with a compound having the structure,

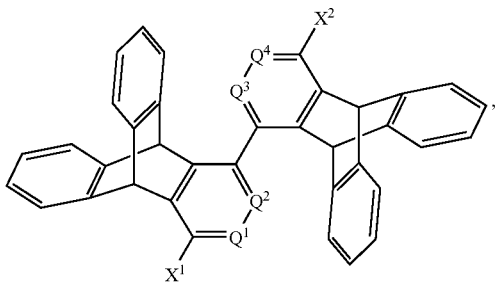

to produce a polymer or oligomer, wherein $X^1$ and $X^2$ can be the same or different and are leaving groups, and $Q^1$, $Q^2$, $Q^3$ and $Q^4$ can be the same or different and are heteroatoms.

DETAILED DESCRIPTION

Figure 1:
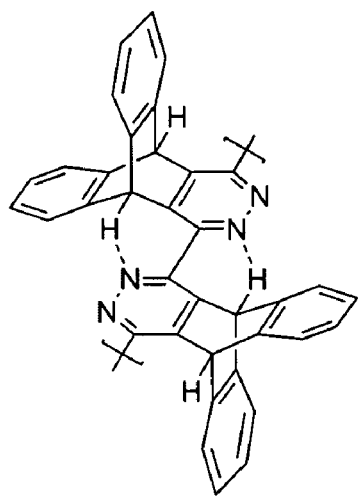
FIG. 1 shows illustrative examples of polymers of the present invention, wherein the polymer is stabilized via hydrogen-bonding (FIGS. 1A-B) or metal-binding (FIGS. 1C-D).
Figure 1:
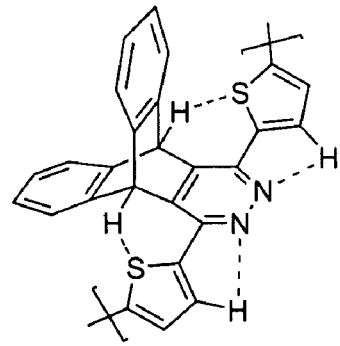
Figure 1:
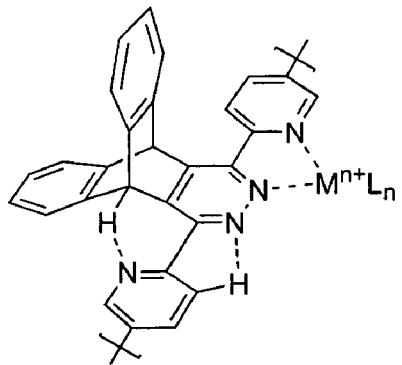
Figure 1:
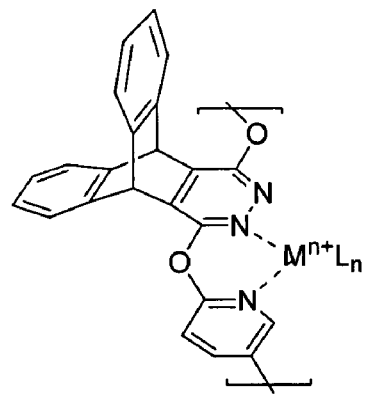

The present invention provides materials, devices, and methods involving new heterocyclic, shape-persistent monomeric units with high internal free volume. The invention provides compositions and materials that can serve as good low-K dielectric materials and, as noted herein and as will be understood by those of ordinary skill in the art, the materials have other advantageous applications.

In some cases, materials the present invention may be monomers, oligomers, or polymers that incorporate a heterocyclic iptycene moiety, where the species can be shape-persistent. The heterocyclic, shape-persistent moiety may be capable of having secondary interactions with, for example, adjacent monomers within the same polymer, stabilizing the polymeric structure as discussed more fully below. One significant advantage that can be realized in connection with species of the invention that include a heteroatom on a monomeric, oligomeric, or polymeric unit is that the species may facilitate hydrogen-bonding interactions with a hydrogen on an adjacent unit. The present invention may also provide materials comprising polymers having electron-poor heterocyclic rings (e.g., pyridazine rings) in the polymer backbone, resulting in materials having low dielectric constants and improved stability at high operating temperatures due to the electron-poor character of the heterocyclic ring. Some embodiments of the present invention present advantages over known dielectric materials since they do not contain potentially thermally labile groups, such as fluorine atoms. In addition, compositions of the invention may be easily synthesized from inexpensive starting materials and may be readily modified to suit a particular application.

Various embodiments of the invention involve materials comprising a shape-persistent group such as an iptycene (e.g., triptycene, pentiptycene, and the like) that comprises a heteroatom. In some cases, the iptycene comprises an aromatic ring comprising at least one heteroatom to form a heterocyclic iptycene. That is, the heterocyclic iptycene may comprise at least one heteroatom, where the heteroatom is not positioned on the bridgehead of the iptycene. For example, in one embodiment, the heterocyclic iptycene may comprise a pyridine ring.

As used herein, a "heterocyclic iptycene" includes an iptycene moiety comprising a heterocyclic group, such as a heteroaryl or heterocycloalkyl group. The term "heteroaryl" or "heteroaromatic" or "aryl heterocycle" as used herein may include 5-, 6-, 7-, and 8-membered aromatic groups that include from one to four heteroatoms, selected from nitrogen, oxygen and sulfur, the remaining ring atoms being carbon, where one or more ring atoms may be optionally substituted with one or more substituent described herein. "Heteroatom" as used herein, includes atoms that are not carbon that take positions normally occupied by carbon in an organic or other carbon-containing structure. The term "heteroaryl" also includes fused, polycyclic ring systems (at least one of which is aromatic). Examples of heteroaryl groups include, but are not limited to, pyridine, imidazole, pyrimidine, pyrazole, triazole, pyrazine, pyridazine, tetrazole, furan, thiophene, isoxazole, thiazole, oxazole, isothiazole, pyrrole, quinoline, isoquinoline, indole, benzimidazole, benzofuran, cinnoline, indazole, indolizine, phthalazine, pyridazine, triazine, isoindole, pteridine, purine, oxadiazole, triazole, thiadiazole, thiadiazole, furazane, benzofurazane, benzothiophene, benzothiazole, benzoxazole, quinazoline, quinoxaline, naphthyridine, and furopyridine, substituted derivatives thereof, spiro derivatives thereof, and the like.

The term "heterocycloalkyl" may include 5-, 6-, 7-, and 8-membered saturated or partially saturated rings that include from one to four heteroatoms, as described herein. "Heterocycloalkyl" may also include fused, polycyclic rings. Examples of heterocycloalkyl rings include, but are not limited to, piperidine, piperazine, morpholine, pyrrolidine, tetrahydrofuran, dihydrofuran, tetrahydrothiophene, dihydrothiophene, tetrahydropyran, dihydropyran, substituted derivatives thereof, spiro derivatives thereof, and the like.

In some embodiments, the present invention involves polymers comprising a heterocyclic iptycene which forms part of the polymer backbone. For example, the heterocyclic iptycene may comprise a five-membered or a six-membered heteroaryl ring (e.g., a pyridine ring, a pyridazine ring, etc.) that forms part of the polymer backbone such that the heteroaryl ring may be in pi-conjugation with the polymer backbone. In other embodiments, the heterocyclic iptycene comprises a heteroaromatic ring that may be attached to the polymer backbone via the bridgehead atoms of the iptycene, but may not be in direct, pi-conjugation with the polymer backbone. In some embodiments, the heterocyclic iptycene may comprise heteroatoms in both the polymer backbone and on an aromatic ring that is pendant to the polymer backbone. It should be understood that the present invention encompasses all embodiments wherein the atoms of an iptycene framework may be carbon or heteroatom, provided that the bridgehead atoms of the iptycene moieties are carbon.

In one set of embodiments, compositions of the present invention may comprise a polymer comprising a shape-persistent molecule having at least 20% free volume (e.g., an iptycene), wherein the shape-persistent molecule comprises at least two heteroatoms. The polymer may comprise two heteroatoms located in a pi-conjugated polymer backbone. The polymer may also comprise two heteroatoms not located in a pi-conjugated polymer backbone. In one embodiment, a polymer may comprise a heterocyclic iptycene comprising a pyridazine ring that is in conjugation with the polymer backbone.

For polymers of the present invention, the presence of heteroatoms within an iptycene moiety may allow various stabilizing secondary interactions to take place between, for example, adjacent monomers within the same polymer, neighboring polymers, polymers and analytes, polymers and ligands, or the like. In some cases, secondary interactions between adjacent monomers of a polymer may increase the conjugation length of the polymer by causing at least a portion of the polymer to adopt a planar structure. For example, adjacent aryl or heteroaryl monomers that may be freely rotatable about the polymer backbone may become restricted or stabilized by secondary interactions (e.g., hydrogen bonding) such that the aromatic rings lie in the same plane relative to one another. The alignment of pi-orbitals or pi-systems of adjacent aromatic groups may increase the conjugation length of the polymer. In some embodiments, a polymer comprises a first monomeric unit that forms a hydrogen bond with a second monomeric unit, such as an adjacent monomeric unit. In some cases, hydrogen-bonding may occur between a heteroatom on an iptycene moiety and an adjacent moiety, such as an aryl or heteroaryl group.

In an illustrative embodiment shown in FIG. 1A, hydrogen bonding can occur between adjacent heterocyclic iptycene monomers. For example, the bridgehead proton on one iptycene monomer may form a hydrogen bond with a nitrogen on an adjacent heterocyclic iptycene. FIG. 1B illustrates another embodiment where hydrogen bonds may be formed in multiple ways, such as between a heteroatom of an iptycene and a proton on a neighboring aryl or heteroaryl group, or, between a bridgehead proton on an iptycene and a heteroatom on a neighboring heteroaryl group, such as a thiophene. In both FIG. 1A and FIG. 1B, the hydrogen bonds may cause aryl groups in the polymer backbone to align in the same plane relative to one another, increasing the conjugation length and stabilizing the polymer.

In some cases, polymers of the present invention may comprise monomeric units that are capable of binding metal ions, wherein the metal ions may form bonds with heteroatoms on a monomeric unit. In some cases, the metal may form a first bond with a heteroatom on a first monomeric unit and a second bond with a heteroatom on a second monomeric unit, such an adjacent monomeric unit. Some illustrative embodiments are shown in FIG. 1C and FIG. 1D. For example, FIG. 1C shows an embodiment where a metal ion may bind two heteroatoms on two adjacent monomers, such as a heterocyclic iptycene and a pyridine. This may be considered analogous to the binding of a metal ion to, for example, a 2,2'-bipyridine ligand, wherein two, adjacent heterocyclic rings may be planarized with respect to one another by binding of both heteroaryl rings to a metal ion. FIG. 1D shows another embodiment of the invention, where a poly (aryl ether) may comprise a heterocyclic iptycene adjacent to, for example, a pyridine ring. Binding of a metal ion to the heteroatom of the pyridine and the heteroatom of the heterocyclic iptycene may cause the monomeric units to lie in the same plane relative to one another, increasing the conjugation length. The metal binding in FIG. 1D may be considered analogous to binding of a metal ion to an acetylacetonate ligand, wherein a 1,3-dicarbonyl moiety becomes planarized upon metal binding.

In some embodiments, metal ions may bind to the polymer via less than all available coordination sites of the metal, allowing the metal to further bind other species, such as analytes, ligands, other polymers, or the like. For example, the metal may form a first bond with a heteroatom on the polymer, a second bond with a second monomeric unit on the polymer, wherein the second monomeric unit is adjacent to the first monomeric unit, and at least one bond with a species selected from among an analyte, a ligand, or a neighboring polymer.

Figure 2A:
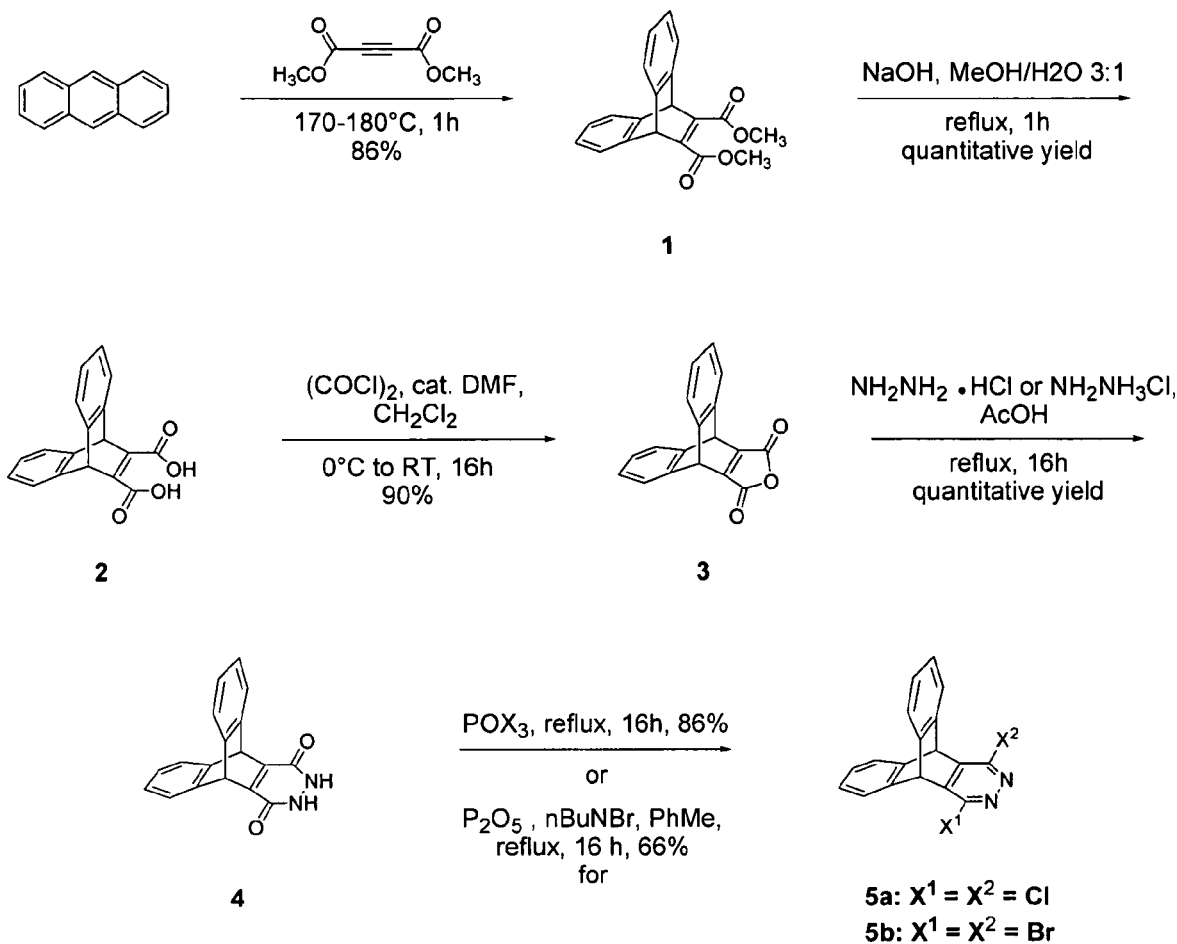
FIG. 2 illustrate the syntheses of two monomers comprising heterocyclic, shape-persistent molecules, according to some embodiments of the present invention.

Some embodiments of the present invention provide a monomer having an electron-poor heterocyclic ring, such as a monomer having the structure of Formula I,

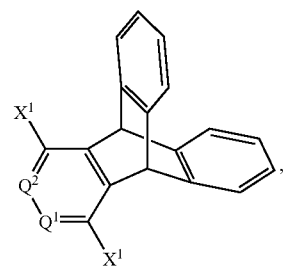

wherein $X^1$ and $X^2$ can be the same or different and are leaving groups, and $Q^1$ and $Q^2$ can be the same or different and are heteroatoms. The term "leaving group" is recognized in the art of synthetic organic chemistry and refers to an atom or a group capable of being displaced by a nucleophile. Examples of suitable leaving groups include, but are not limited to, halides (such as chloride, bromide, and iodide), alkanesulfonyloxy, arenesulfonyloxy, alkyl-carbonyloxy (e.g., acetoxy), arylcarbonyloxy, mesyloxy, tosyloxy, trifluoromethane-sulfonyloxy, aryloxy (e.g., 2,4-dinitrophenoxy), methoxy, N,O-dimethylhydroxylamino, pixyl, and the like. In some embodiments, $X^1$ and $X^2$ can be a halide, such as chloride or bromide, and $Q^1$ and $Q^2$ are nitrogen. In one embodiment, the compound of Formula I may be synthesized in five steps using inexpensive starting materials such as anthracene and dimethylacetylenedicarboxylate, as shown in FIG. 2A and described herein.

Figure 2B:
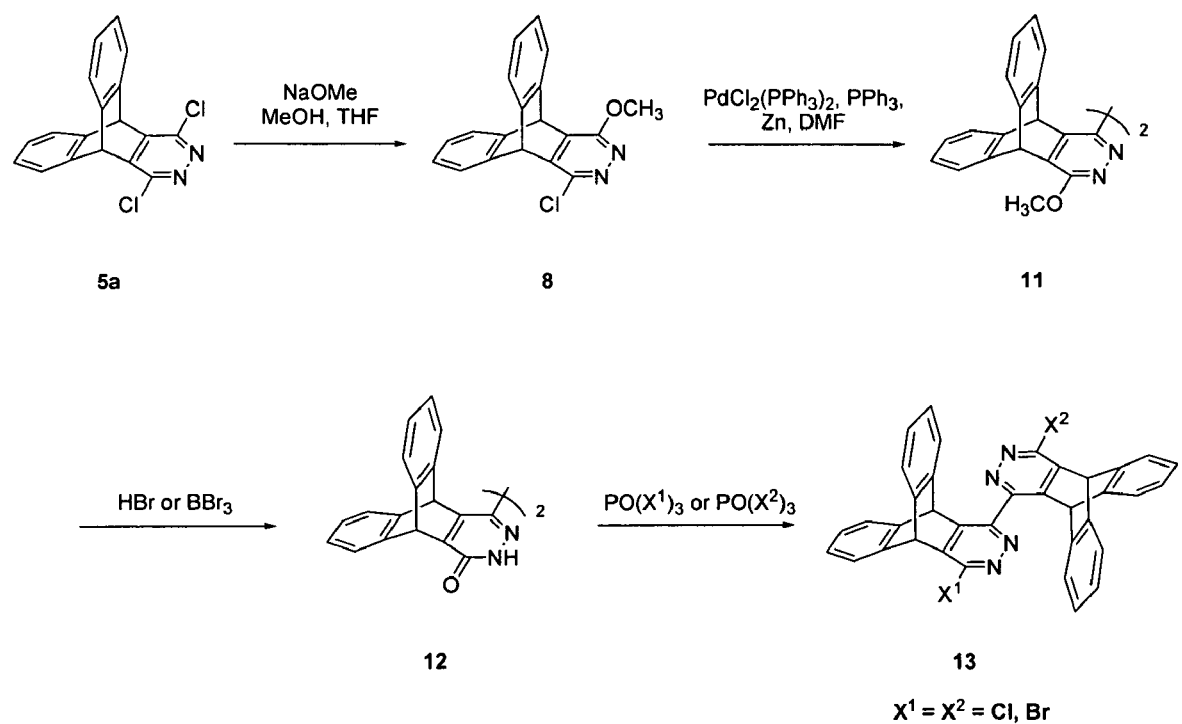

In another embodiment, the present invention may provide a monomer having the structure of Formula II,

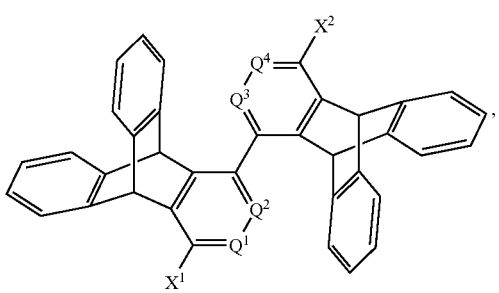

wherein $X^1$ and $X^2$ can be the same or different and are leaving groups, and $Q^1$, $Q^2$, $Q^3$ and $Q^4$ can be the same or different and are heteroatoms. In some embodiments, $X^1$ and $X^2$ can be a halide, such as chloride or bromide, and $Q^1$, $Q^2$, $Q^3$ and $Q^4$ are nitrogen. Compounds of Formula II may be synthesized from, for example, a compound of Formula I in four steps using known methods, as shown in FIG. 2B and described herein.

Another aspect of the present invention relates to methods for synthesizing polymers or oligomers comprising reacting at least one monomeric species with a compound having the structure of either Formula I or Formula II to produce a polymer or oligomer. The electron poor nature of the pyridazine ring and the substitution of leaving groups in compounds of Formula I and Formula II may allow nucleophilic aromatic substitution and transition metal-catalyzed cross-coupling chemistry at the 3- and 6-positions of the pyridazine ring. This reactivity may facilitate the use of such compounds in polymerization methods such as, for example, polycondensations, cross-coupling polymerizations, and the like. The electron-poor pyridazine ring may also increase stability of the resulting polymers, preventing oxidation and degradation. Polymers which incorporate monomers of Formula I and Formula II comprise a rigid three-dimensional scaffold based on a [2.2.2] bicyclic ring system of the iptycene family that may prevent the close packing of the monomeric unit with adjacent molecules or polymer chains, resulting in the incorporation of voids, and, as a result, internal free volume, at the molecular level.

Compositions of the present invention may comprise a polymer having a structure comprising the formula,

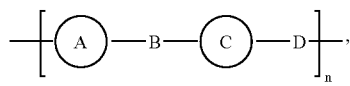

wherein A and C can be the same or different and each comprises an aromatic group; B and D can be absent, heteroatom, alkene, alkyne, or substituted derivatives thereof; and n is less than about 10,000. In some embodiments, at least one of A and C comprises an iptycene moiety. In some embodiments, at least one of A and C comprises an iptycene and B and D are oxygen. In some embodiments, at least one of A and C comprises an iptycene and B and D are alkenyl. In some embodiments, at least one of A and C comprises an iptycene and B and D are alkynyl. Some embodiments may comprise a polymer structure wherein A, B, C and D are optionally substituted with R, and R can be hydrogen, halide, alkyl, heteroalkyl, aryl, heteroaryl, alkenyl, heteroalkenyl, alkynyl, heteroalkynyl, alkoxy, aryloxy, aryl, cyano, nitro, hydroxyl, a carbonyl group, or substituted derivatives thereof.

In some embodiments, the polymer comprises a monomeric unit having the structure,

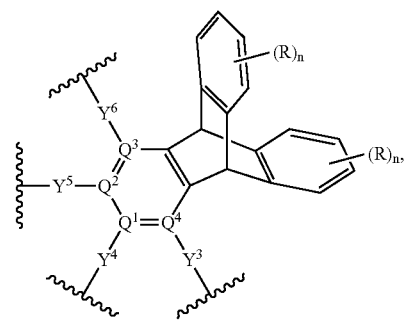

wherein $Q^1$, $Q^2$, $Q^3$, and $Q^4$ can be the same or different and are selected from among carbon, heteroatom, or substituted derivatives thereof; $Y^3$, $Y^4$, $Y^5$, and $Y^6$ can be absent, alkyl, heteroalkyl, alkenyl, heteroalkenyl, alkynyl, heteroalkynyl, aryl, heteroaryl, aralkyl, heteroaralkyl, heteroatom, or substituted derivatives thereof; any number of R groups can exist as substitutents to rings as indicated, and each R can be the same or different and can be selected from among halide, alkyl, heteroalkyl, aryl, heteroaryl, alkenyl, heteroalkenyl, alkynyl, heteroalkynyl, alkoxy, aryloxy, aryl, cyano, nitro, hydroxyl, a carbonyl group, or substituted derivatives thereof; and n can be 0, 1, 2, 3, or 4.

Some embodiments of the invention may comprise poly (aryl ether)s, poly(arylene vinylene)s, poly(arylene ethynylene)s, or poly(arylene)s that incorporate a heterocyclic iptycene unit. In one set of embodiments, A comprises an iptycene, C comprises an aryl group selected from among phenyl, thiophene, bithiophene, 2-(3,4-ethylenedioxy)thienyl, an iptycene moiety, and substituted derivatives thereof, and B and D are absent.

In a particular embodiment, the polymer may comprise a monomeric unit having the structure,

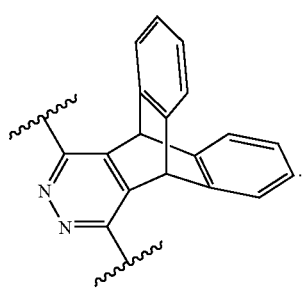

In one embodiment, the polymer may have the structure,

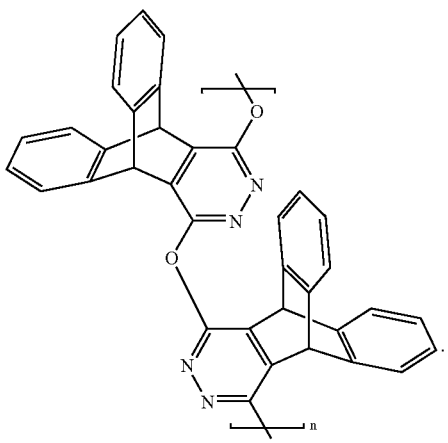

In another embodiment, the polymer may have the structure,

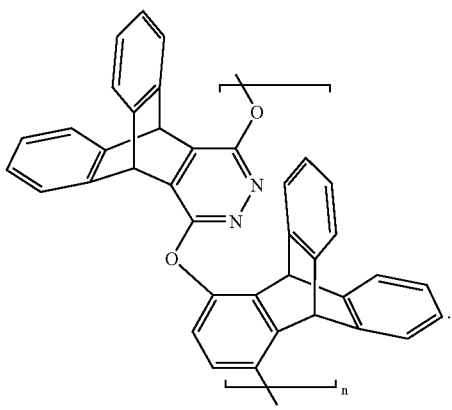

In another embodiment, the polymer may have the structure,

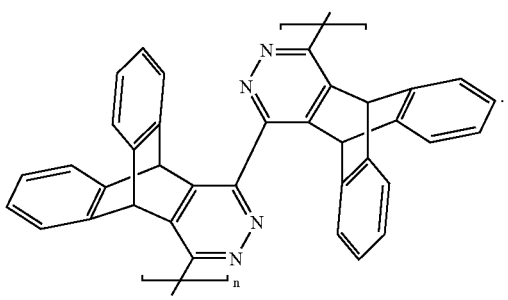

In one embodiment, compositions of the present invention may be arranged as a dielectric material in an electronic component. In one set of embodiments, dielectric materials of the invention comprising shape-persistent molecules have a dielectric constant of less than 3.0, preferably less than 2.5, preferably less than 2.0, or preferably 1.5 or less. The invention includes electronic devices comprising dielectric components comprising the shape-persistent molecules (e.g., as substrate materials or coatings, structural or non-structural device components, capping materials, packaging materials, and the like) as would be well-understood by those of ordinary skill in the art. Some embodiments of the invention may comprise polymers that do not contain potentially thermally labile groups, such as fluorine atoms, which may be advantageous for use of such polymers in devices requiring high manufacturing temperatures, high operating temperatures, or exposure to aggressive chemicals or radiation, for example.

Monomers comprising heterocyclic iptycenes of the invention may be synthesized in high yields and with readily available starting materials, such as anthracene and dimethylacetylenedicarboxylate. (FIG. 2A) Synthetic procedures to make, for example, dihalide monomer 5 may be readily scalable to multigram quantities using inexpensive reagents. According to one embodiment of the present invention (FIG. 2A), diester 1 may be obtained by a thermal Diels-Alder reaction between anthracene and neat dimethylacetylene dicarboxylate. Aqueous hydrolysis followed by dehydrative cyclization may provide anhydride 3, which may be quantitatively converted to pyridazinone 4 by heating to reflux in the presence of hydrazine monohydrochloride in a polar solvent such as glacial acetic acid, water, ethanol or a glycol methyl ether. In one embodiment, anhydride 3 may be heated to reflux in glacial acetic acid in the presence of hydrazine monohydrochloride to afford pyridazinone 4. Alternatively, in some cases, pyridazinone 4 may be synthesized directly from diester 1 or from an acid chloride derivative of diacid 2, in the presence of hydrazine, either as a hydrazine salt or a free base.

Pyridazinone 4 may converted to the corresponding dihalide monomer 5 by reaction with neat phosphorus oxyhalide. For example, reaction with an excess of phosphorus oxybromide may yield dibromide 5b. Alternatively, dibromide 5b can be synthesized by reaction of pyridazinone 4 with one equivalent of phosphorus oxybromide in molten carbon tetrabromide or by reaction of pyridazinone 4 with phosphorus pentoxide and tetrabutylammonium bromide in refluxing toluene.

In some embodiments, dihalide monomer 5 may be optionally substituted as described herein. For example, hydrogens on the aromatic rings or in bridgehead positions may be substituted with alkyl, alkoxy, alkynyl, aryl, acyl, and the like. In some cases, any aromatic ring of dihalide monomer 5 may be fused with an aryl group.

In some embodiments, dimers of dihalide monomer 5 may also be synthesized. (FIG. 2B) For example, asymmetric diaryl substitution of dihalide monomer 5 may be achieved through selective mono-methoxylation of the starting dichloride 5 can be achieved by reaction with one equivalent of sodium methoxide at room temperature in tetrahydrofuran to yield the methoxy chloride 8. Metal-catalyzed (e.g., palladium-catalyzed, nickel-catalyzed, etc.) reductive coupling of methoxy chloride 8 may produce methoxy dimer 11. Subsequent cleavage of the methyl groups and treatment with $POX_3$ (e.g, $POCl_3$) affords the dihalide dimer 13.

Polymers of the present invention may be synthesized by numerous methods known in the art. For example, a class of polymers may be synthesized using dihalide monomers 5 and 13.

In some embodiments, poly(aryl ether)s may be synthesized by a base-mediated condensation reaction between aromatic alcohols and activated, electron-poor, aromatic ring substituted by leaving groups. For example, poly(aryl ether)s may be synthesized by the polymerization of a dihalide monomer and a diol monomer, as shown in Scheme 1.

Scheme 1

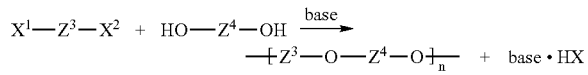

Figure 7:
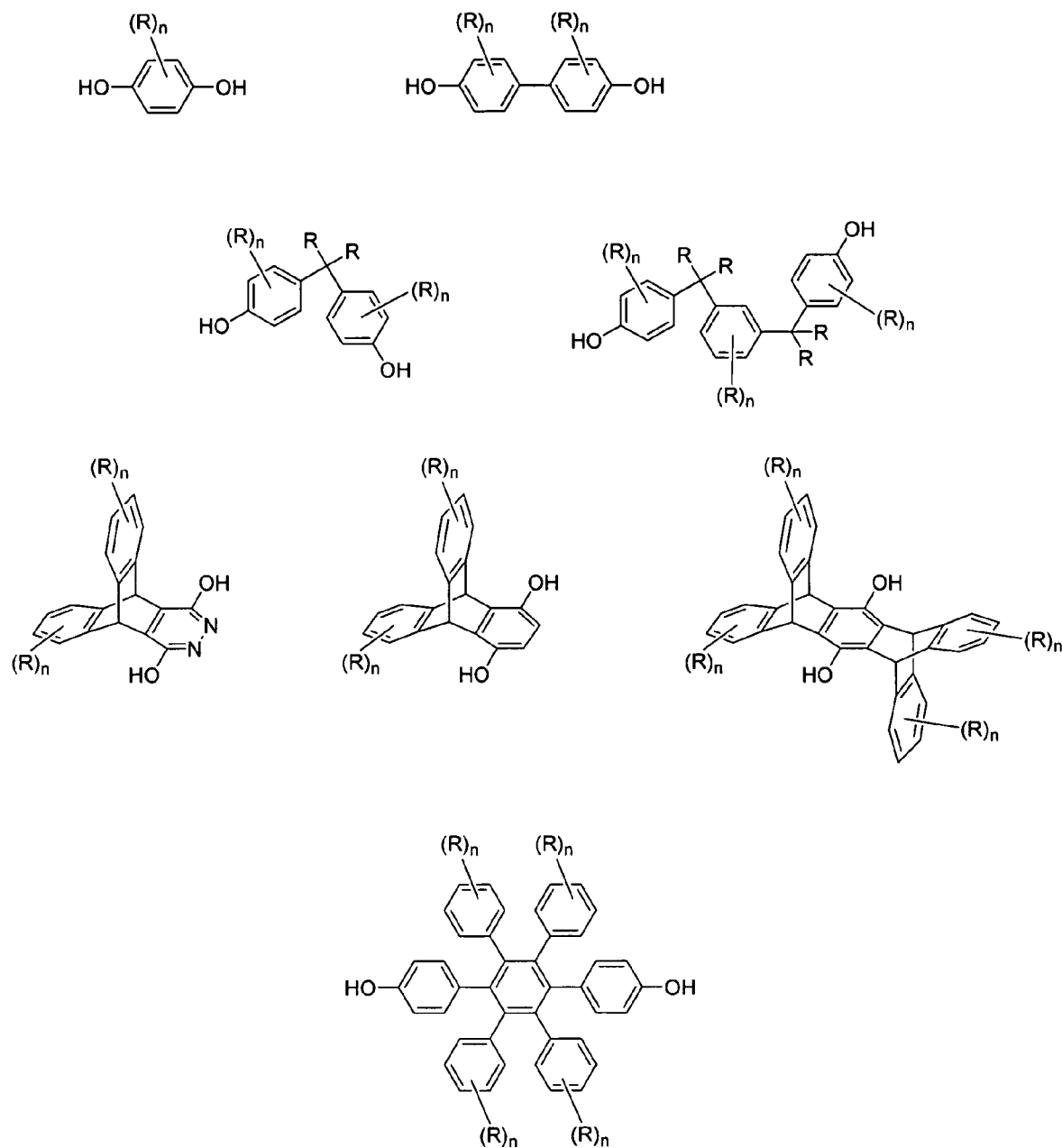
FIG. 7 shows certain exemplary monomers of certain embodiments of the present invention.

As shown in Scheme 1, base-catalyzed polycondensation of a dihalide monomer ($X^1$—$Z^3$—$X^2$), where $X^1$ and $X^2$ are leaving groups and $X^1$ and $X^2$ can be the same or different, and a diol monomer (HO—$Z^4$—OH) may afford a poly(aryl ether). The term "diol" is known in the art and refers to a moiety substituted with two hydroxyl groups. In some embodiments, $Z^3$ may be a shape-persistent molecule, such as an iptycene or a heterocyclic iptycene, or substituted derivatives thereof. In the diol monomer, $Z^4$ may be aryl, heteroaryl, aralkyl, heteroalkyl groups, or substituted derivatives thereof. In some cases, the dihalide monomer comprises a shape-persistent molecule, such as heterocyclic iptycene. Some examples of diol monomers suitable for use in the present invention are shown in FIG. 7. For example, poly(aryl pyridazyl ether)s may be synthesized by the polymerization of a dihalide monomer and a diol monomer, as shown in Scheme 1. The base may be any suitable base to facilitate or catalyze polycondensation, such as potassium carbonate, and the like. In other embodiments, the polymerization may involve the use of other multifunctional halide monomers or alcohol monomers, such as triols, tetraols, and the like.

Figure 3:
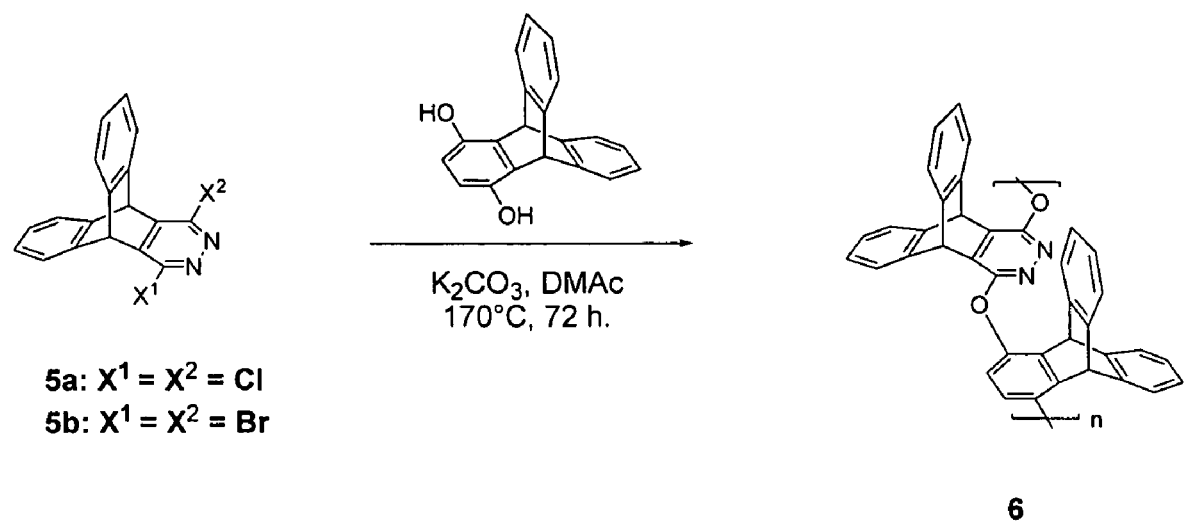
FIG. 3 illustrates the synthesis of a poly(aryl ether), according to one embodiment of the present invention.

An illustrative embodiment of a poly(aryl ether) synthesized by the polycondensation of a heterocyclic iptycene monomer and a diol monomer is shown in FIG. 3. Polycondensation of the dichloride 5a with a diphenol such as triptycene hydroquinone may be performed by stirring the reactants at 170-180° C. in dimethyl acetamide in the presence of potassium carbonate. In some cases, the polycondensation may be performed using a solvent, such as a dipolar aprotic solvent. Examples of suitable solvents include dimethyl acetamide, sulfolane, dimethyl formamide, N-methyl-2-pyrrolidinone, and methyl sulfoxide. In one embodiment, the polycondensation may be performed in dimethyl acetamide. In some embodiments, where the diol is a hydroquinone moiety, deaeration of the reaction mixture may be desirable for the polycondensation due to the rapid oxidation of the hydroquinone to the quinone in the presence of atmospheric oxygen at elevated temperatures.

Figure 4:
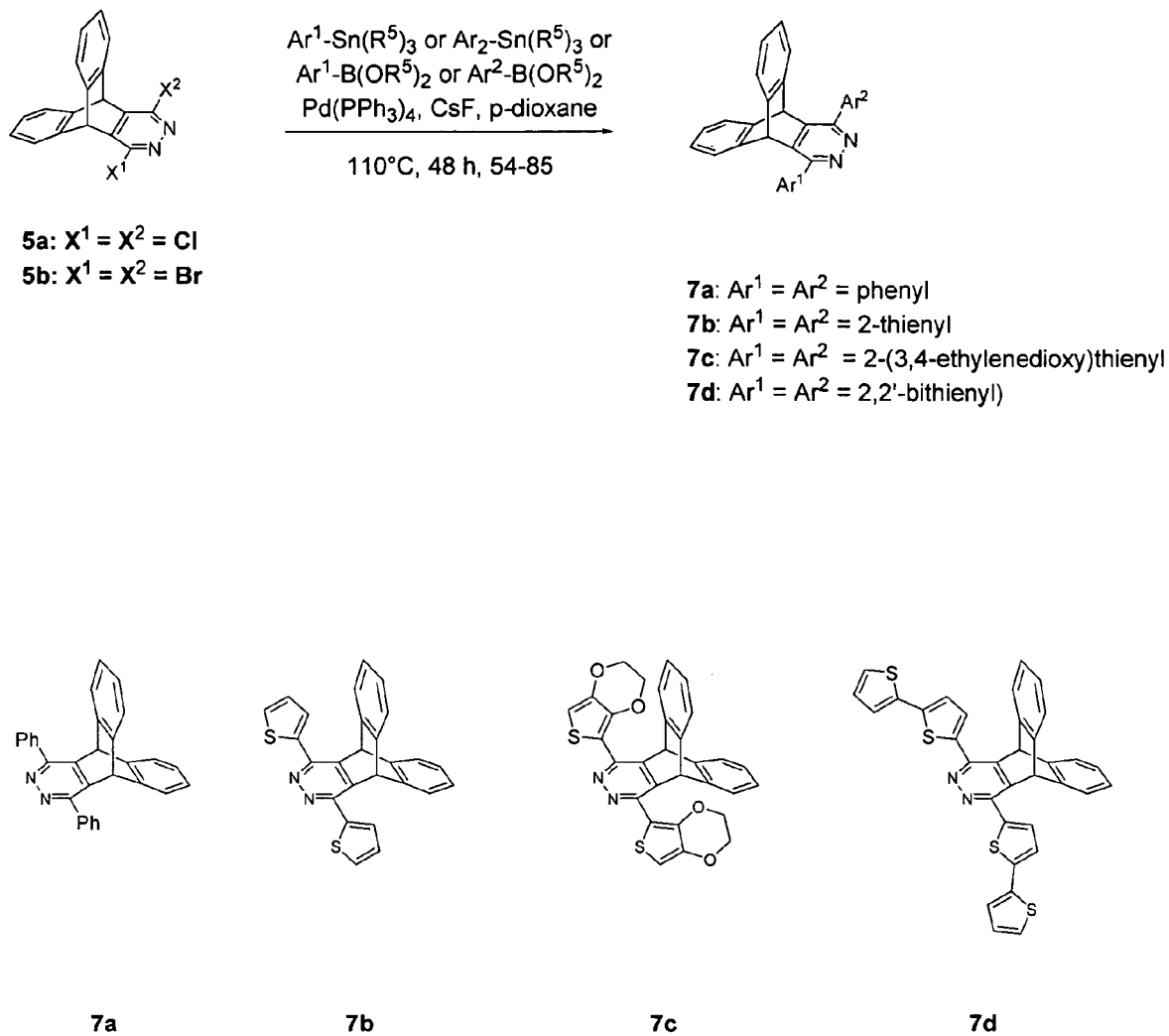
FIG. 4 illustrates the syntheses of conjugated compounds and monomers, according to some embodiments of the present invention.
Figure 5:
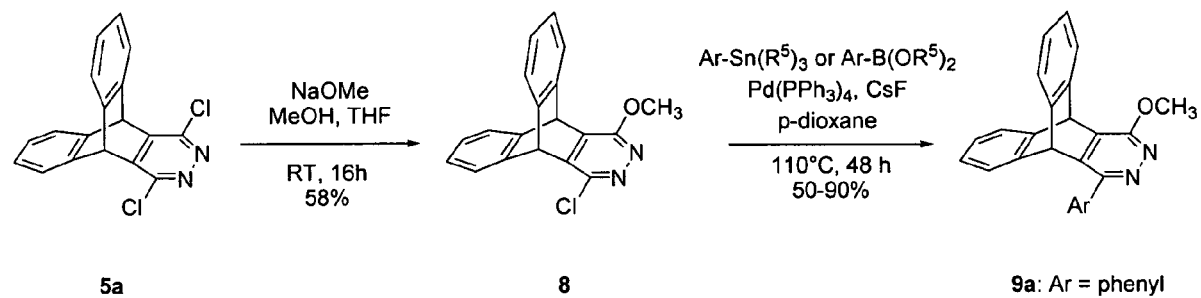
FIG. 5 illustrates the synthesis of an asymmetrically substituted heterocyclic iptycene, according to one embodiment of the present invention.

Dihalide heterocyclic iptycene monomers of the present invention may also be used to synthesize a variety of monomers for other types of polymerzation reactions using known transition metal-catalyzed cross-coupling methodologies, including the Suzuki-Miyaura, Heck, Negishi, Stille, Kumada, and Sonogashira cross-coupling reactions, and the like. The cross-coupling methods may involve transition metal catalysts known to those skilled in the art, such as palladium, nickel, etc. In some embodiments, symmetrically substituted heterocyclic iptycene monomers may be synthesized, as shown in FIG. 4, wherein the same functional groups may be installed at each reactive site. In some embodiments, the heterocyclic iptycene monomers may be asymmetrically substituted, that is, substituted with the different groups at each reactive site. As shown in FIG. 5, cross-coupling of methoxy chloride 8 with a desired nucleophile (e.g., tin or boron nucleophile, or the like) may yield methoxy aryl 9. If desired, deprotection of the methoxy group (e.g., using hydrobromic acid or boron tribromide) and conversion of the resulting pyridazinone into a cross-coupling partner using a phosphorus oxyhalide or trifluoromethanesulfonic anhydride may allow for further elaboration using cross-coupling methodologies.

Conjugated polymers may also be synthesized using heterocyclic iptycene monomers of the present invention. In some cases, transition metal-catalyzed cross-coupling reactions may be used to synthesize conjugated polymers. Substitution of the pyridazine ring of monomer 5 with halides, for example, chlorides or bromides, may allow for the efficient polymerization using known transition metal-catalyzed cross-coupling methodologies, as described herein. In some embodiments, conjugated polymers such as poly(arylene)s, poly(arylene ethynylene)s, poly(arylene vinylene)s, and poly (arylene thienylene)s may be prepared according to the cross-coupling reaction shown in Scheme 2.

Scheme 2

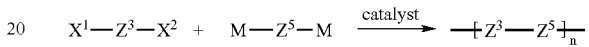

Transition metal-catalyzed cross-coupling of a dihalide monomer ($X^1$—$Z^3$—$X^2$), as described herein, and a nucleophilic monomer (M—$Z^5$—M) having the appropriate functionalization to act as a cross-coupling partner may afford a conjugated polymer in the presence of catalyst. In some embodiments, $Z^5$ may be alkenyl, heteroalkenyl, alkynyl, heteroalkynyl, aryl, heteroaryl, aralkyl, heteroalkyl, aralkenyl, heteroalkenyl, aralkynyl, heteroalkynyl, or substituted derivatives thereof. In order to facilitate cross-coupling, M may be Li, $MgX^3$, $ZnX^3$, $Sn(R^5)_3$, $B(OR^5)_3$, Cu, or the like, where $X^3$ is halide and $R^5$ is hydrogen (in the case at least of $B(OR^5)_3$), alkyl, aryl, cycloalkyl, or $R^5$ forms a ring with another substituent on boron. The dihalide monomer may have an electrophilic atom which may be susceptible to a cross-coupling reaction, e.g., the electrophilic atom bears a leaving group $X^1$ or $X^2$.

For example, poly(aryl pyridazyl ether)s may be synthesized by the polymerization of a dihalide monomer and a diol monomer, as shown in FIG. 4. In an illustrative embodiment, dihalide 5 may be coupled with aryl groups to give triaryl monomer 7 by transition metal-catalyzed cross-coupling with the corresponding aryl stannanes, aryl boronates or arylboronic acids, and the like. In some embodiments, the use of tetrakis(triphenylphosphine)palladium(0) (e.g., 5 mol %) in dioxane using a base/activator (e.g., cesium fluoride) may afford the corresponding cross-coupling product in high yield starting from dichloride monomer 5. In some embodiments, the use of bulky, electron-donating ligands may be required. In some embodiments, electron-rich nucleophiles, such as electron-rich stannanes and boron nucleophiles, may be employed. In some embodiments, the use of $Ni(dppp)_2Cl_2$ (e.g., 5 mol %) may allow for cross-coupling of dichloride monomer 5 with, for example, a lithiated aryl or lithiated heteroaryl. In some cases, a dihalide heterocyclic iptycene monomer may be reacted with an aryl stannane (e.g., via a Stille reaction).

Figure 6:
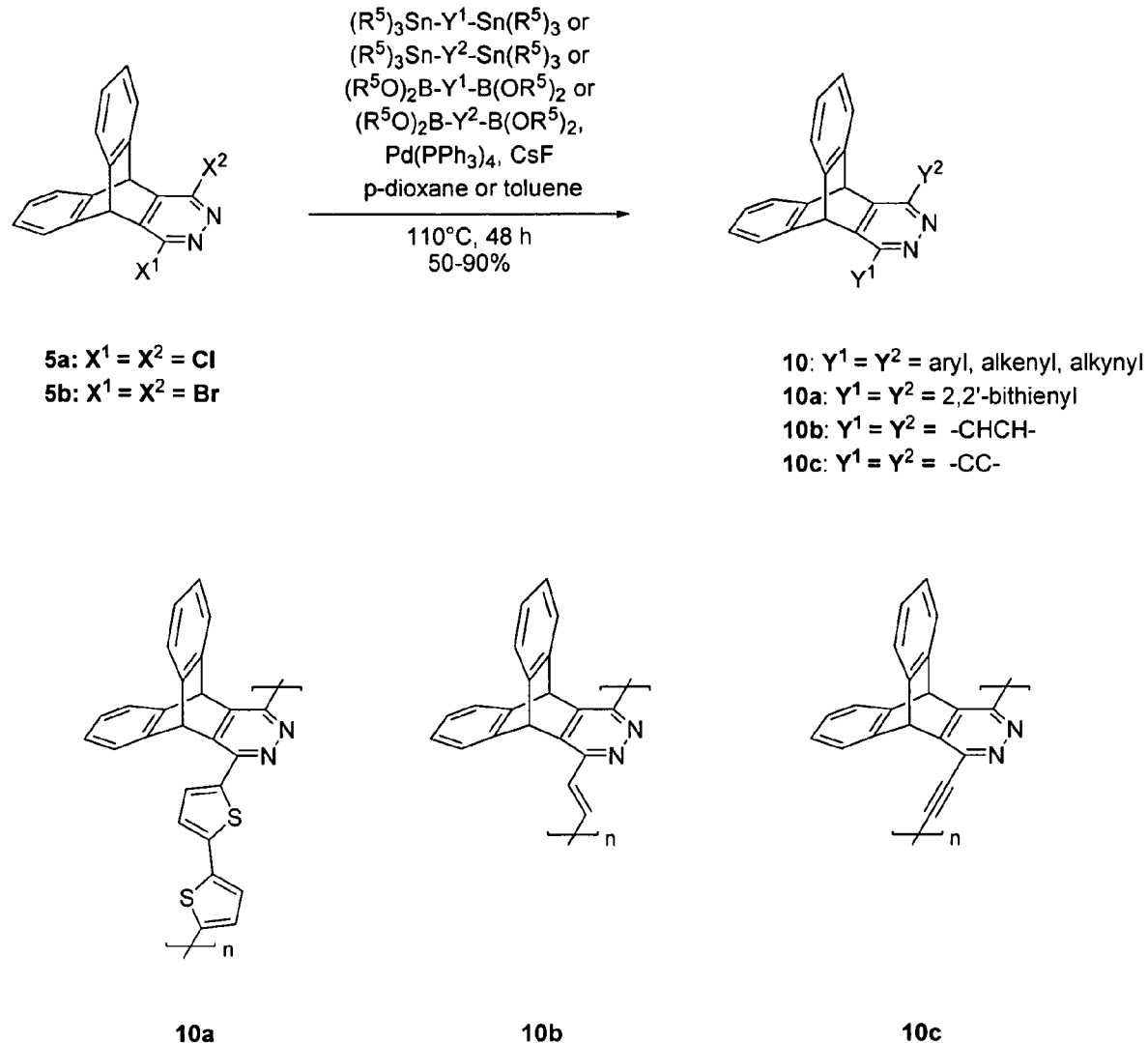
FIG. 6 illustrates the syntheses of conjugated polymers, according to some embodiments of the present invention.

Transition-metal cross-coupling methodologies may also be employed to synthesize pi-conjugated polymers (e.g., via Stille or Suzuki reactions) via step growth polymerization. In some cases, difunctional monomers may be used as cross-coupling partners. For example, dihalide monomers (e.g., dihalide monomer 5) may be cross-coupled with distannanes, diboronates or diboronic acids to produce pi-conjugated polymers, such as poly(arylene)s, poly(phenylene ethynylene)s (PPEs), and poly(phenylene vinylene)s (PPVs), as shown in FIG. 6. PPVs may be prepared through the coupling between, for example, aryl dihalides and phenylene bis(vinylboronate) derivatives (e.g, Suzuki reaction). In some cases, highly pure difunctional monomers may be required for such step growth polymerizations. For example, pinacol ester derivatives of bisvinyl borates may be designated as monomers for the synthesis of PPVs to facilitate efficient purification. Pinacol esters of organic borates may be stable to column chromatography conditions, facilitating purification.

In some embodiments, compositions of the present invention may comprise a shape-persistent molecule having internal free volume and high thermal stability. As used herein, a "shape-persistent molecule," refers to a molecule with a significant amount of rigid structure, as is understood by those of ordinary skill in the art. Preferably, in a shape-persistent molecule, no portion of the molecule having a combined molecular weight of at least 15 g/mol may move relative to other portions of the molecule via rotation about a single bond. In other embodiments of shape-persistent molecules, no portion of the molecule having a molecular weight of greater than 25, 50, or 100 g/mol can move relative to other portions of the molecule via rotation about a single bond. Rigid structures may be provided, for example, by aromatic rings, such as aryl and heteroaryl rings, other cyclic and polycyclic structures, and the like.

Shape-persistent structures of the present invention may belong to a class of polymers and molecules based on iptycene structures. Iptycenes and like molecules have previously been reported in, for example, Hart, "Iptycenes, Cuppendophanes and Cappedophanes," *Pure and Applied Chemistry*, 65(1):27-34 (1993); or Shahlia et al., "Synthesis of Supertriptycene and Two Related Iptycenes," *Journal of Organic Chemistry*, 56:6905-6912 (1991). For example, "triptycene" and "pentiptycene" molecules are known, where, in this class of iptycene-based structures, the prefix indicates the number of arene planes.

The "internal free volume" or "free volume" of a molecule is defined as the volume in space taken up by a molecule, where boundaries defining the internal free volume span all projections or protrusions of the molecule. Shape-persistent molecules may be considered to have a length, width, and thickness. These dimensions may be considered to span an imaginary box which the molecule, as defined by its van der Waals volume, may rest. The molecule may be positioned within the box, in relation to a set of x, y, and z axes, such that the shortest axis in the arrangement defines the molecule's thickness. The minimum thickness of a planar shape-persistent molecule may be defined as the distance between the portions of the molecule located above and below a plane within which the molecule can be defined (or which can be contained completely within the molecule), for example a plane defined by the carbon nuclei of benzene ring. For example, in a benzene ring, the van der Waals radii for the carbon atoms is about ±1.9 Å. A second example is a molecule such as [2.2.2] bicyclooctane, where the thickness of the molecule would be measured from the van der Waals contacts of the outer hydrogen atoms, or about 5.54 Å.

While compositions of the present invention may have shape-persistent structures, it should be understood that these structures do not define the internal free volume. Rather, the internal free volume is defined by the volume in space taken up by the molecule, where boundaries defining the internal free volume span all projections or protrusions of the molecule. It is noted that the internal free volume need not be totally enclosed. A combination of enclosed and open volumes in structures together can define free volume within the scope of the invention. The interior free volumes of such structures may be defined by objects that have an external plane that may be directed along one axis. Another architecture is one in which the internal space of the object may further be enclosed by additional objects, for example, objects having a concave surface. This may create an even greater delineation between internal and external space.

In one set of embodiments of the invention, shape-persistent materials of the invention have a minimum height or length of approximately 6.214 Å, a value based on the distance between the van der Waals contacts of the 1 and 4 hydrogen atoms of a benzene ring. In one set of embodiments, molecules of the invention include bridgehead atoms and the molecular structures that radiate from the bridgehead atoms extend outwardly therefrom such that each defines a van der Waals contact of furthest point from the bridgehead atoms of no less than 3.5 Å. In other embodiments, the van der Waals contact of furthest point from the bridgehead atoms is no less than 4.0 Å, 4.5 Å, 5.0 Å, 5.5 Å, 6.0 Å, or 6.2 Å.

Molecules of the invention, in preferred embodiments, have at least 20% free volume; preferably at least 30%, more preferably at least 50% free volume, more preferably greater than 70% free volume, and most preferably greater than 90% free volume.

Techniques for determining free volume may include determining the density of the rigid shape-persistent molecule itself, without solvent, and without other, like molecules or different molecules dispersed within the material to take up some of the free volume. Alternatively, or where this is impossible, free volume may be deduced from density measurements. For density measurements for determination of free volume, the density may be compared with a solvent of similar composition. Determination of free volume from density measurement may be carried out in a straightforward manner by those of ordinary skill in the art. For example, most hydrocarbons have a density between 0.7 g/ml and 0.9 g/ml, and many polymers have densities of about 0.8 g/ml; hence, lower densities may be indicative of free volume. For example, a density of 0.4 g/ml may indicate a free volume of about 50%.

As most flexible materials will adopt a structure that may minimize free volume, to maintain high free volume, the precise nature of the rigid shape-persistent structure may be important. Preferred shape-persistent structures used in the invention may minimize the interpenetration of shape-persistent structures into each other's free volume. Such interpenetration may decrease the net internal free volume.

As an illustrative example, in a shape-persistent polymer comprised only from benzoid rings and hydrocarbon side chains, the reduction in dielectric constant that will accompany the internal free volume can be determined as follows. For a material with 50% free volume, the dielectric constant may be reduced to about 1.55 (vacuum=1.0). For a material with 70% free volume, the dielectric constant may be about 1.33, and for 90% free-volume dielectric constant may be about 1.09. In contrast, conventional $SiO_2$ dielectrics with the proper performance typically have dielectric constants of 3.5 to 4.0. Thus, a material with a composite of a shape-persistent materials and a polymer needed to meet other barrier and adhesive properties may be useful as a dielectric coating in high performance integrated circuits.

In one embodiment, the materials of the present invention incorporate free volume directly into the molecular design, allowing for greater uniformity of pore sizes, as well as smaller pore sizes. The present invention provides sub-nanoporous materials in accordance with one set of embodiments. "Sub-nanoporous" materials are defined herein as materials with pores smaller than 10 nm, preferably smaller than 5 nm, and more preferably smaller than 4 nm in size. The structures of the materials may be rigid and non-collapsible. The small pore size may decrease or eliminate metal diffusion and short-circuiting, or lower the dielectric constant of the material.

As used herein, the term "polymer" is given its ordinary meaning in the art. A polymer is generally composed of one or more monomers or "repeat units," which are chemically bonded together in some fashion. In one set of embodiments, the polymer is constructed to allow extended electronic interactions along the polymer, preferably along the backbone of the polymer. The electronic interactions may allow excitons or electrons to be transmitted along the polymer. For example, the polymer may have double bonds, triple bonds, benzene rings, naphthalene rings, anthracene rings, triphenylenes, pyrroles, furans, thiophenes, imidazoles, oxazoles, thiazoles, triazoles, pyrazoles, pyridines, pyrazines, pyridazines, pyrimidines, fluorenes, carbazoles, iptycenes, heterocyclic iptycenes, or other structures that allow excitons or electrons to be transmitted along the polymer. Other systems having similar arrangements of atoms to produce delocalized pi-bonds are also within the scope of the invention, as well as moieties containing delocalized pi structures having additional substituents, such as oxygen, sulfur, silicon, germanium, nitrogen, a halogen, or the like. For example, nitrogen atoms may be substituted for carbon atoms within a delocalized pi structure, such as in pyridines and similar compounds. In one set of embodiments, the polymer is constructed such that electronic interactions extend at least 2 monomer units from their source. In other embodiments, the electronic interactions may extend at least 5 units, at least 10 units, at least 100 units, at least 500 units, at least 1000 units, and, in some cases, throughout the entire backbone of the polymer.

In one embodiment, the polymer has at least one conjugated portion. In such an arrangement, electron density or electronic charge may be conducted along the portion where the electronic charge is referred to as being "delocalized." Each p-orbital participating in conjugation can have sufficient overlap with adjacent conjugated p-orbitals. In one embodiment, the conjugated portion is at least about 3 nm in length. In another embodiment, substantially the entire backbone is conjugated and the polymer is referred to as a "conjugated polymer." Polymers having a conjugated pi-backbone capable of conducting electronic charge are typically referred to as "conducting polymers," and may show enhanced conductivity relative to non-conjugated polymers. Typically, atoms directly participating in the conjugation form a plane, the plane arising from a preferred arrangement of the p-orbitals to maximize p-orbital overlap, thus maximizing conjugation and electronic conduction. An example of a conjugated pi-backbone defining essentially a plane of atoms are the carbon atoms of a polyacetylene chain. In certain embodiments, the electron delocalization may also extend to adjacent polymer molecules, such as between two chromophores.

In a delocalized structure, the electrons in the p-orbitals forming the pi bond may cover multiple atom centers, which are said to be in "pi-communication" or "pi-electron communication." As used herein, "pi-orbitals," "pi structures," "pi-backbone," and the like are given their ordinary definitions as is understood in chemistry, where the electrons in orbitals between adjacent atoms are shared, creating a chemical bond between the adjacent atoms. Similarly, "pi-stacking" or "intermolecular pi-pi interactions" generally refers to structures in which the pi-orbitals of nearby molecules are adjacent, overlapping, or otherwise affect each others' properties, for example, by changing the rate of the release of photons by excitons or by introducing other mechanisms by which excitons release energy in the form of heat.

An "exciton" may be transmitted along the energy migration pathway of the polymer by intrachain transfer, for example, along a pi backbone due to the presence of delocalized pi-orbitals. The pi backbone, or other analogous structures, that are able to transmit the exciton may also be referred to as "energy migration pathways." In some cases, the pi backbone amplifies the effect of the absorbed energy quanta. The exciton may also be transmitted between different molecules, by interchain transfer. This transmission may occur by any means, for example, transmission through the release of a photon from one molecule and the absorbance of that photon by another molecule or the same molecule, transmission through the transfer of kinetic energy, transmission due to the overlap of pi-orbitals between the different molecules commonly called Dexter or resonant energy transfer mechanisms, or longer range energy transport through a dipolar mechanism called Förster energy transfer. Pi-backbone structures may be used, for example in solutions or in thin films, to amplify the sensitivity of the polymer to external compounds.

The "persistence" or "persistence length" of a polymer molecule, as used herein, is a measure of the length over which a polymer points in the same direction as its first bond, and may be used to quantify the overall rigidity of the molecule or a portion thereof. The persistence may be, for example, greater than about 10 nm, preferably greater than about 15 nm, and more preferably greater than about 20 nm, 25 nm, or longer. Similarly, the radius of gyration may also be used as a measure of the rigidity of a molecule. The radius of gyration may be defined in terms of the distribution of distances (in any direction) of each monomer in the molecule from the center of gravity of the molecule. In one set of embodiments, the polymer molecules may have a structure (e.g., a charge or a particular side group) that prevents or resists aggregation of the polymer molecules into an aligned structure.

In one set of embodiments of the present invention, compositions of the invention comprising iptycenes are provided that may have average molecular weights greater than 1000 grams/mole ("daltons"), preferably greater than 2000 daltons, preferably greater than 2500 daltons, and more preferably greater than 3000, 4000, or 5000 daltons. The materials may be soluble in common solvents, for example, selected from the group consisting of water, chloroform, carbon dioxide, toluene, benzene, hexane, dichloromethane, tetrahydrofuran, ethanol, acetone, and acetonitrile. The materials may be soluble in a least one of the solvents, or at least two, or three of any of these solvents. "Soluble" in this context means soluble at greater than 0.5 mg/ml, preferably greater than 1 mg/ml, more preferably greater than 5 mg/ml, and more preferably still greater than 10 mg/ml. The materials of the invention may also be preferably soluble in common liquid crystals ("LC") such as cyano-biphenyls, bicyclohexyls, or cyclohexylphenyls, and may be miscible with common polymers such as polyethylene, polyvinyl chloride, poly(methyl methacrylate), polydimethylsiloxane, polyimides, polyisoprene, polypropylene, polystyrene, and co- and block polymers that include these.

Iptycenes of the present invention may comprise a [2.2.2] bicyclic ring system, where each of the bridgehead atoms may be connected to three cyclic aromatics, and at least one of the cyclic aromatics may be connected to another [2.2.2] bridgehead-pair of center, or may be fused to another aromatic system (shares at least one bond in common with another aromatic system). In some embodiments, at least two of the cyclic aromatics emanating from the central [2.2.2]

system may be fused to another aromatic system or connected to another [2.2.2] center, and in other embodiments, all three cyclic aromatics may be fused to other aromatic systems or connected to a bridgehead center. For example, dienes may emanate from bridgehead centers of various molecules of the invention. Also, dienophiles may emanate from bridgehead centers. Those of ordinary skill in the art will recognize that, using selected dienes and/or dienophiles, additional syntheses (e.g., via Diels-Alder reactions, for example) may result in any of a wide variety of shape-persistent, high free volume molecules.

In one set of embodiments shape-persistent, high-free-volume molecules are based upon structures disclosed in International Patent Publication WO 99/57528, published Nov. 11, 1999, U.S. patent application Publication US2004/0116650, filed Jul. 15, 2003, and U.S. Pat. No. 6,783,814, filed Aug. 21, 2001, incorporated herein by reference, modified to include heteroatoms in accordance with this disclosure.

For example, the present invention may include polymers comprising the structure,

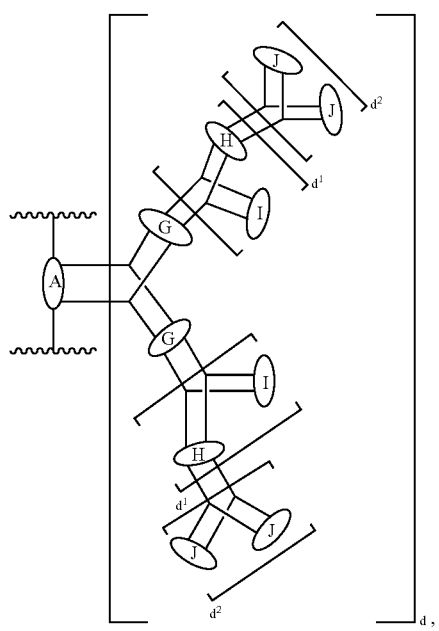

wherein G, H, I, and J can be the same or different and are chose from among aryl and heteroaryl, and d=1, 2, and $d^1$=0, 1, such that when $d^1$=0, $d^2$=0, and when $d^1$=1, $d^2$=0, 1.

In some embodiments, G and H may be the same or different, and each may be selected from the aromatic group consisting of:

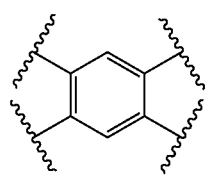

-continued

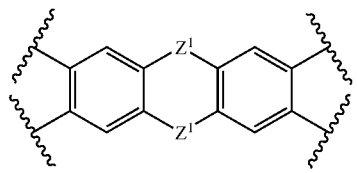

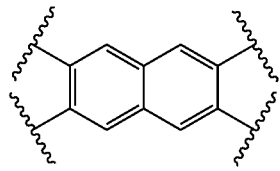

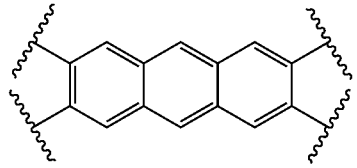

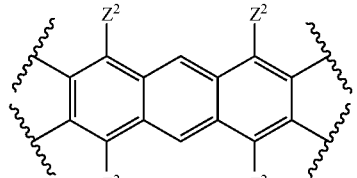

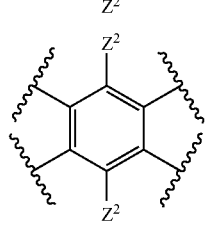

I and J may be the same or different and each can be selected from the group consisting of:

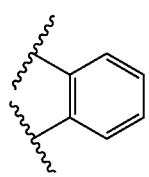 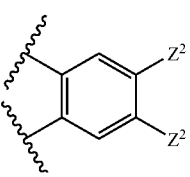

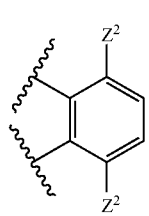 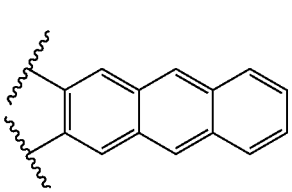

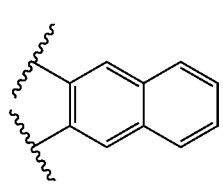

-continued

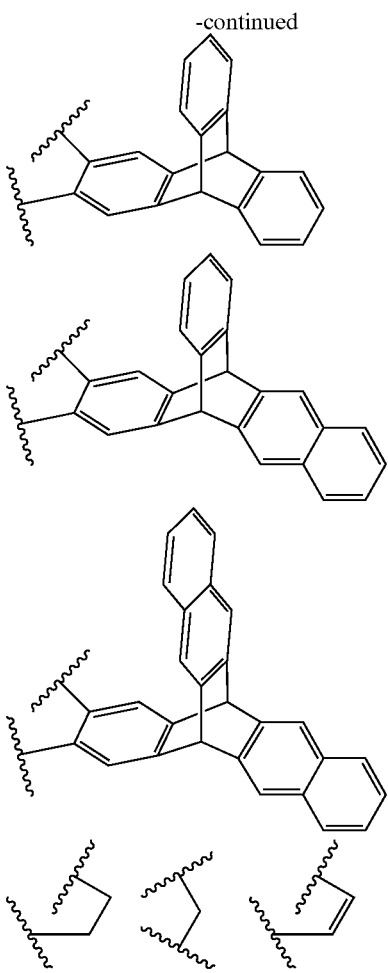

Any hydrogen in G, H, I and J may be substituted by $R^2$, where $R^2$ can be selected from the group consisting of $C_1$-$C_{20}$ alkoxy, phenoxy, $C_1$-$C_{20}$ thioalkyl, thioaryl, C(O)O$R^3$, N($R^3$)($R^4$), C(O)N($R^3$)($R^4$), F, Cl, Br, $NO_2$, CN, acyl, carboxylate and hydroxy. $R^3$ and $R^4$ may be the same or different, and each may be selected from the group consisting of hydrogen, $C_1$-$C_{20}$ alkyl, and aryl. $Z^1$ may be selected from the group consisting of O, S and N$R^8$ where $R^8$ can be selected from the group consisting of hydrogen, $C_1$-$C_{20}$ alkyl, and aryl. $Z^2$ may be selected from the group consisting of F, Cl, O$R^3$, S$R^3$, N$R^3R^4$ and Si$R^8R^3R^4$.

A may be an aromatic group, including aryl and heteroaryl groups, and can be similar to or identical to a branch G, H, I, or J. In some embodiments, A may be a shape-persistent structure described herein. A single branch of G, H, I, J may be used in combination with any other shape-persistent organic structure described herein and joined at a bridgehead center.

In one embodiment, A is a pyridazine ring, G is phenyl, d=1, $d^1$=0, and $d^2$=0.

In one embodiment of the invention, molecules for use in the formation of rigid shape-persistent polymers with high degrees of internal free volume may involve substitution about the bicyclic ring system, which may provide the needed geometry to provide internal free volume in the structure. In some embodiments of the invention, rigid shape persistent polymers with high degrees of internal free volume may be provided in which the distance from the bridgehead atom to the van der Waals contact of the most distant atom of the smallest substituent directly attached to the bridgehead carbon is more than 4 Å, preferably 5 Å, 6 Å, or 7 Å, or even greater. The significance of this group is that it serves to define additional free volume and internal surfaces, from which important organizational properties in conjunction with, for example, polymers and liquid crystals may be optimized. The larger groups further provide structures with greater shape persistence, since the polymers may not be easily collapsed and prevent the interpenetration of one polymer into another.

Bicyclic ring systems of the invention may be produced via synthesis using the Diels-Alder reaction. Other structures may be used in certain embodiments in the invention, for example, ladder polymers or ribbon structures, which each may contain rigid aromatic rings systems. These and related structures may be used in combination with other features of the invention, such as attachment to dyes, "bundling" of molecules, and the like. As used herein, a "ladder" polymer is a polymer having a backbone that can only be severed by breaking two bonds.

Materials of the present invention may comprise any number of substituents (R) that may maintain the bicyclic nature of the ring system, and, in certain cases, able to maintain the rigidity or the conductivity of the polymer. The substituents may be located anywhere within the ring systems, and may include, for example, hydrocarbons (including alipahatic or cyclic hydrocarbons), substituted hydrocarbons (e.g., with halogens, nitrogens, oxygens, etc.), or the like. Examples of substituents include O, NR, S, an aromatic group, an alkene (e.g., CR=CR), $CR_2$, $CR_2$—$CR_2$, or the like. As used herein, "R" represents a generic substituent, as understood by those of ordinary skill in the art. R may include, for example, hydrocarbons, nitrogen compounds, halogens, oxygenated compounds, hydrogen atoms, or the like. Any R can be the same or different.

As used herein, "hydrocarbon" is meant to include alkyl, alkenyl, alkynyl, cycloalkyl, aryl, alkaryl, aralkyl, and the like. The hydrocarbon may be optionally interrupted by a heteroatom or heteroatom group, including, —O—, —CONH—, —CONHCO—, —NH—, —CSNH—, —CO—, —CS—, —S—, —SO—, —(OCH$_2$CH$_2$)$_n$R (where n=1-10), —(CF$_2$)$_n$— (where n=1-10), olefins, and the like. For example, R can be an alkyl group, preferably having 1 to 24 carbon atoms, more preferably 1 to 18 carbon atoms; an alkenyl group, preferably having 2 to 4 carbon atoms; an aminoalkyl group, preferably having 1 to 8 carbon atoms, and optionally substituted on the nitrogen atom with one or, preferably two alkyl groups, preferably having 1 to 4 carbon atoms; an alkyl group, preferably having 1 to 4 carbon atoms, having a five- or six-membered heterocyclic ring as a substituent; an allyloxyalkyl group, preferably having up to 12 carbon atoms; an alkoxyalkyl group, preferably having a total of 2 to 12 carbon atoms; an aryloxyalkyl group, preferably having 7 to 12 carbon atoms; an aralkyl group, or the like.

Of course, the polymer is not limited solely to carbon compounds, but also to polymers containing other elements that are able to polymerize, for example, but not limited to, nitrogen, boron, silicon, or germanium. For example, the polymer backbone may consist of only silicon or germanium atoms, or the polymer backbone may include a combination of several elements, for example, carbon and silicon atoms. In some embodiments, the backbone may be conductive; in other embodiments, however, the backbone may be semiconductive; in yet other embodiments, the polymer may be photoconductive. For example, a spectral comparison of one of the monomer units to the polymer molecule may demonstrate a change in the energy gap between the highest filled molecular or electronic orbital and the lowest unfilled molecular or electronic orbital of the monomer may be greater than about 0.1 eV, greater than about 0.5 eV, or greater than about 1 eV. In some embodiments, the energy gap may be less than about 5 eV, less than about 3 eV, or less than about 2 eV, or less than 1 eV. By choice of the polymer structure the energy gap may be tuned to match the ultraviolet, the visible, and infrared regions of the electromagnetic spectrum.

Additionally, molecules of the present invention may be fluorinated. Fluorinated molecules may display lower dielectric constants, and may further reduce capacitive interactions between neighboring interconnects on semiconductor devices. Altering the hydrophobicity of the molecules may further reduce capacitive interactions.

Shape-persistent polymers may also have solubilizing side chains. These chains may be chosen, for example, to be hydrocarbons (e.g., tert-butyl groups), or perfluoro groups. Desirable materials may include those that do not contain polar functionality, and may be reoriented or polarized by electric fields, giving a low dielectric constant. Furthermore, the molecular structures may be are chosen such that the molecules have minimal or no affinity for water, such as atmospheric water.

The solubility of conjugated polymers may be increased by attaching pendant groups such as alkyl, alkoxy, aryl, aryloxy, acyl, or silyl groups to the main polymer chain. In one embodiment, tert-butyl groups may be incorporated as substituents on, for example, aromatic groups within the polymer to increase solubility.

In some cases, polymer grafts can be synthesized using polymers of the present invention. For example, a monomer unit may each comprise two types of reactive sites, one of which may react with another monomer unit to form the polymer backbone, and another of which may be available for grafting after formation of the polymer. Functional groups which may be used for grafting are known in the art. For example, polymers of the present invention may be substituted with styrene moiety, which may be used to graft polystyrene from the polymer backbone.

In some cases, incorporating heterocyclic iptycenes in PPEs or PPVs may minimize interpolymer chain contacts so as to increase the fluorescence efficiencies. Iptycene moieties may also be incorporated into other conjugated systems to generate polymers with variety of electronic properties. 1,4-diethynyltriptycenes may be prepared as a precursor for the synthesis of both PPV- and PPE-containing triptycene moieties.

Polymers contemplated by the present invention may be, for example, random, block, or graft polymers, and the homopolymer or each block of a block-polymer may be atactic, isotactic, or syndiotactic. Additional polymers in the present invention may comprise monomers having one or more bicyclic ring systems (e.g., a [2.2.2] bicyclic system, a [2.2.3], a [2.1.1], a [2.2.1] system, or the like), which may be unsubstituted or substituted in some cases. The bicyclic ring systems may further include olefins, aliphatic or aromatic groups, heterocyclic compounds, or the like.

In one set of embodiments, the polymer may include formulas such as, for example $[W]_n$, $[AW]_n$, or $[AWB]_n$, where A and/or B represent bicyclic moieties, W represents a cyclic moiety or a substituted cyclic moiety (comprising any number of molecules in a ring, for example a ring of 5 or 6 atoms), and A and W, and, optionally, B and W, are fused. In certain embodiments, W represents a substituted benzene, or a heterocyclic ring such as pyridazine ring.

The shape-resistant properties of polymers disclosed herein may be useful in a number of applications. For example, conjugated polymers may be used to fabricate electronics devices. Applications in devices such as light emitting diodes, field-effect transistors, photovoltaic devices, and sensors may be envisioned. In one aspect of the invention, bulky properties of conjugated polymers may be tailored using controlled organization of the polymer chains. In another set of embodiments, the invention may be used in a device having improved conductivity, for example, as in a wire or an electrical device. The device may conduct, for example, electrons or holes.

In one embodiment, the invention provides a sensor. As used herein, a "sensor" refers to any device or article capable of detecting an "analyte," i.e. any chemical, biochemical, or biological entity (e.g. a molecule) to be analyzed. The sensor may have high specificity for the analyte, and may be a chemical, biological, or explosives sensor. In one embodiment, a binding site for the analyte can be linked to the polymer (e.g. chemically bonded or otherwise linked), and positioned in close enough proximity physically, or within sufficient electronic or inductive communication range, such that interaction of the analyte with the binding site causes a detectable change in the optical properties of the polymer. The binding site may comprise a biological or a chemical molecule able to bind to another biological or chemical molecule in a medium, e.g. in solution. For example, the binding site may include a chemical receptor able to bind to an explosive molecule such as trinitrotoluene (TNT), such as may be present within a land mine. Reactive functionality may be inserted into the material that can be used to detect the presence of a reactive chemical such as an enzyme or a chemical warfare agent (e.g., a nerve gas). The receptor unit may also be designed to bind to a biological molecule, such as, for example, DNA, proteins, carbohydrates, a virus, a cell, bacteria, anions, cations, or gases. In some cases, the sensors may be used in applications such as drug discovery, the isolation or purification of certain compounds, or high-throughput screening techniques.

In some embodiments, the polymer includes a chromophore, the polymer being capable of emitting radiation with a quantum yield of at least about 0.05 times that of a quantum yield of the polymer in solution. The polymer may be used in methods for amplifying an emission, comprising providing an article comprising the polymers described herein, wherein the polymers have an energy migration pathway and a chromophore; exposing the article to a source of energy to form an excitation energy; and allowing the excitation energy to travel through the migration pathway and to transfer to the chromophore, causing an emission that is greater than an emission resulting from a polymer free of an energy migration pathway. In some cases, the polymers also have reduced pi-stacking.

In other embodiments, the present invention includes sensors comprising a composition comprising a polymer and a chromophore, the sensor further comprising an activation site wherein the chromophore is capable of activation by an analyte at the activation site; and an energy migration pathway within the polymer, wherein energy can be transferred between the pathway and the activation site. In some cases, the composition is capable of emission, wherein the emission is variable and sensitive to a property of a medium surrounding the sensor. The property may be a dielectric constant or an electric field, for example. In another embodiment, the present invention provides an amplification device comprising compositions having an energy migration pathway capable of transporting an excitation energy and a chromophore in electronic communication with the energy migration pathway, the chromophore being capable of emitting an enhanced radiation.

In other embodiments, the present invention provides on organic light-emitting device ("OLED") comprising the polymer compositions described herein. The combination of extended conjugation, stabilizing secondary interactions and resistance to environmental degradation through oxidation confers the resulting polymers especially attractive properties for the development of long-lived polymer/organic light emitting devices. Electroactive polymers based on the thienylpyridazyl units such as polymer 10a (FIG. 6) are predicted to have promising properties as electrochromic materials for which the limited interaction between adjacent polymer chains may lead to sharper and more saturated color changes. In some cases, the OLED may be able to produce polarized light (e.g., circularly polarized light), which may be due to aggregation of polymers of the present invention. The OLED's, in particular embodiments, may comprise one or more stable aggregates of polymers, in contrast to certain other OLED devices where the polymers are generally kept separate. Certain polymer aggregates of the invention may be designed to be excellent conductors of cations (holes) or anions (electrons) or both. The fluorescence efficiency of the aggregates may allow excitons formed by the condensation of electrons and/or holes to produce a bright display in an emitting device. OLEDs comprising polymer aggregates, in certain embodiments, may be used in conjunction with phosphorescent emitters to further improve emission efficiency.

The present invention can also be used in a light-sensitive or light-activated device or sensor, such as a photodetector or a photovoltaic device. Incident light can, for example, interact with a polymer molecule of the invention through a chromophore or an activation site. The exciton produced by such an interaction may then be transmitted, amplified, and/or detected by any suitable means (e.g., through electronic or photonic means), depending on the application. For example, energy may be collected by the activation site in the form of an exciton (e.g., a hole-electron pair), which then migrates to a separation site or a detection site, for example, to store charge or indicate the absorption of a photon. In one embodiment, an exciton in a polymer aggregate may act as an electron donor. Upon diffusion of the exciton to an interface with an acceptor (for example, titanium dioxide, a semiconductor, a polymer/molecular composition capable of accepting an electron, or an electron acceptor in liquid electrolyte), the polymer may transfer an electron to the acceptor, serving as an effective hole transport medium. In another embodiment, the polymer may be an electron acceptor. Upon diffusion of the exciton to an interface with a donor (for example, metal electrode, semiconductor, a polymer/molecular composition capable of donating an electron, or an electron donor in liquid electrolyte), an electron may be transferred to the polymer.

In certain embodiments, the present invention may provide materials useful as electroactive polymer actuator. The incorporation of free volume in such an electroactive polymer may equally yield benefits from an actuation standpoint, as the diffusion of ions within the polymer matrix may be facilitated, resulting in accelerated switching speeds in electroactive polymer actuators.

In some embodiments, compositions of the present invention may be arranged as a dielectric material in an electronic component. As described herein, the internal free volume provided by the shape-resistant moieties may provide porosity in the solid state, resulting in lower dielectric constants. For example, in a solid state, compositions of the present invention may have a dielectric constant of about 3.0 or less, about 2.0 or less, or about 1.5 or less.

Shape-persistent polymers disclosed here may have nanoscopic pockets of air, and may display high compressibility in particular directions. Accordingly, another aspect of the invention involves polymeric compositions of the invention constructed and arranged to absorb a compression-causing force. Such an arrangement would be understood by those of ordinary skill in the art, and includes constructions in essentially any known shock or force-absorbing structure such as an athletic shoe sole, automobile bumper, or any other cushioning structure.

In one embodiment, the shape-persistent polymers of the invention may be used to bind polymer chains together. The polymers function as molecular "clips" for polymers, keeping them bundled together and preventing them from splaying. These methods may be used to produce materials with large material strengths. Bundling materials together may prevent single chains from bearing a full load applied to a material.

In another embodiment, shape-persistent structures of the present invention may be used to bind molecules and polymers within their internal structures. The interaction of the shape-persistent structure with other molecules is anisotropic, providing a preferred orientation between elements. This effect produces a new method for aligning materials in liquid crystals and polymers. Host materials, such as liquid crystals or polymers, may fill the free volume as defined by the rigid shape-persistent guest. These structures may used in, for example, liquid crystals or polymer films.

The uniform or quasi-uniform orientation of conjugated polymers may be the result in the increase of the conductivity and the emission of polarized light. Alignment of the molecules may be achieved using self-organizing liquid crystalline polymers, Langmuir-Blodgett films, or mechanical stretching. Alignment may also be achieved by dissolving the material ("guest") in a liquid crystal ("host"). The directed orientation of solute molecules in liquid crystals takes place as a result of the anisotropic interactions between the two components, known as the "guest-host effect."

This alignment may be used, for example, in color liquid crystal displays. The organization of dichroic dyes in nematic liquid crystals may be required to make a color liquid crystal display. The contrast in these displays may be determined by the contrast ratio between the different states, resulting from the realignment of the liquid crystal director with an electric field. The liquid crystal director in a nematic liquid crystal may be defined as the average direction over which a large grouping of molecular long axes of the liquid crystal point. Control of the director direction may be accomplished in displays by surface forces and electric fields. The individual host molecules may be disordered and have a distribution of directions about the director. The absolute value of the average angle that the individual molecules deviate from the director (direction of orientation) may be used to calculate an order parameter. The size of this angle may be related to intermolecular interactions, thermal fluctuations, and the aspect ratio of the liquid crystals The function and advantage of these and other embodiments of the present invention will be more fully understood from the examples below. The following examples are intended to illustrate the benefits of the present invention, but do not exemplify the full scope of the invention.

While several embodiments of the invention have been described and illustrated herein, those of ordinary skill in the art will readily envision a variety of other means and structures for performing the functions and/or obtaining the results or advantages described herein, and each of such variations, modifications and improvements is deemed to be within the scope of the present invention. More generally, those skilled in the art would readily appreciate that all parameters, materials, reaction conditions, and configurations described herein are meant to be exemplary and that actual parameters, materials, reaction conditions, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, provided that such features, systems, materials and/or methods are not mutually inconsistent, is included within the scope of the present invention.

In the claims (as well as in the specification above), all transitional phrases or phrases of inclusion, such as "comprising," "including," "carrying," "having," "containing," "composed of," "made of," "formed of," "involving" and the like shall be interpreted to be open-ended, i.e. to mean "including but not limited to" and, therefore, encompassing the items listed thereafter and equivalents thereof as well as additional items. Only the transitional phrases or phrases of inclusion "consisting of" and "consisting essentially of" are to be interpreted as closed or semi-closed phrases, respectively. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood, unless otherwise indicated, to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements that the phrase "at least one" refers to, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All references cited herein, including patents and published applications, are incorporated herein by reference. In cases where the present specification and a document incorporated by reference and/or referred to herein include conflicting disclosure, and/or inconsistent use of terminology, and/or the incorporated/referenced documents use or define terms differently than they are used or defined in the present specification, the present specification shall control.

EXAMPLES

General Methods and Instrumentation. Synthetic manipulations that required an inert atmosphere (where noted) were carried out under an inert nitrogen or argon atmosphere using standard Schlenk techniques or in an inert-atmosphere glovebox. NMR ($^1$H and $^{13}$C) spectra were recorded on Varian Mercury 300 MHz, Varian Inova 500 MHz or Bruker Avance 400 MHz spectrometers. The chemical shift data for each signal are given in units of d (ppm) relative to tetramethylsilane (TMS) where d (TMS)=0, and referenced to the residual solvent resonances. Splitting patterns are denoted as s (singlet), d (doublet), t (triplet), q (quartet), m (multiplet), and br (broad). High-resolution mass spectra (HR-MS) were obtained at the MIT Department of Chemistry Instrumentation Facility on a Bruker Daltonics APEX II 3 Tesla FT-ICR-MS using electron impact ionization (EI) with a voltage of 70 V or electrospray ionization (ESI). Polymer molecular weights were determined by gel permeation chromatography (GPC) against polystyrene standards (PolySciences Inc.) using THF as mobile phase at a flow rate of 1.0 mL/min on an Agilent series 1100 HPLC system equipped with three PLGel 5 μm $10^5$, $10^4$, $10^3$, (300×75 mm) columns in series, a refractive index detector and a diode array detector monitoring at 254 and 450 nm. Melting point (m.p.) determination was performed using a Laboratory Devices MEL-TEMP II instrument (open capillaries used) and are reported uncorrected. UV-vis spectra were obtained from Agilent 8453 Diode Array Spectrophotometer. Fluorescence spectra were measured with a SPEX Fluorolog 2 fluorometer (model FL112, 450W xenon lamp) equipped with a phase modulation unit and a model 1935B polarization kit and with a SPEX Fluorolog τ3 fluorometer (model FL312, 450W xenon lamp) with either right angle detection (solution measurements) or front-face detection (thin-film measurements). The spectra in solution were obtained at room temperature using a fused silica cuvette with a path length of 1 cm. Polymer thin films on a cover glass (18×18 mm) were spin cast from chloroform solutions using a Laurell Technologies Corp. model WS-400 Spin Processor at a spin-rate of 1000 rpm for 1 min.

Materials. All solvents were ACS reagent grade or better unless otherwise noted. Anhydrous toluene, diethyl ether, dichloromethane and tetrahydrofuran were obtained from Mallinckrodt/J. T. Baker and dried on a GlassContour solvent purification system. p-Dioxane was dried over activated Linde type 4X molecular sieves prior to storage in dry, air-free vessels. Silica gel (40-63 µm) was obtained from SilliCycle Inc. All other reagents, compounds and chemicals were obtained from Aldrich Chemical Co., Alfa Aesar, Lancaster Synthesis, Spectrum Quality Products Inc., Strem Chemicals Inc. and TCI and were used without further purification.

Example 1

Dimethyl 9,10-Dihydro-9,10-ethenoanthracene-11,12-dicarboxylate (1). As shown in FIG. 2A, under an atmosphere of nitrogen, anthracene (30 g, 0.17 mol) and dimethylacetylenedicarboxylate (30 g, 0.21 mol) were stirred at 170° C. for 60 minutes. Upon warming the reagents dissolve to form a homogenous phase, which darkens slightly during the course of the reaction. The mixture was then cooled down to yield a gummy brown solid which was purified by recrystallization from methanol to yield the title compound as a pale yellow crystals (46.1 g, 86%). $^1$H NMR (300 MHz, CDCl$_3$): 7.39 (4H, dd, J=5.5 and 3.3 Hz), 7.02 (4H, dd, J=5.5 and 3.3 Hz), 5.49 (2H, s), 3.80 (6H, s).

Example 2

9,10-Dihydro-9,10-ethenoanthracene-11,12-dicarboxylic acid (2). As shown in FIG. 2A, dimethyl ester 1 (43 g, 0.13 mol) and sodium hydroxide (15 g, 0.38 mol) were refluxed for 60 minutes in a solution of methanol (180 mL) and water (60 mL). The resulting mixture was then cooled down for several hours in a refrigerator. Solids were then filtered, washed with small portions of cold methanol, and redissolved in water (ca. 700 mL). The diacid 2 precipitated upon acidification with concentrated hydrochloric acid, was isolated by filtration, washed with small portions of water, and dried under vacuum for several hours to yield the title compound as an off-white solid (39.3 g, 100%). $^1$H NMR (300 MHz, DMSO-d$_6$): 10.3 (2H, br), 7.43 (4H, dd, J=5.1 and 3.0 Hz), 7.02 (4H, dd, J=5.1 and 3.0 Hz), 5.60 (2H, s).

Example 3

9,10-Dihydro-9,10-ethenoanthracene-11,12-dicarboxylic anhydride (3). As shown in FIG. 2A, diacid 2 (8.76 g, 29.2 mmol) was suspended in dry dichloromethane (ca. 300 mL) in a dry, septum-capped round-bottom flask, to which was added a few drops of dry dimethylformamide. The mixture was cooled to 0° C. in an ice-water bath and the flask was connected to a oil-bubbler with flexible plastic tubing. Oxalyl chloride (3.9 g, 30.7 mmol) was added dropwise with a syringe as the suspension was stirred. Within few minutes, gas was released through the oil bubbler as the reaction began. The reaction mixture was adequately cooled prior to the addition of oxalyl chloride to avoid a violent release of gas. The reaction mixture was allowed to warm to room temperature as it was stirred overnight (ca. 16 h), during which the reaction mixture became homogeneous. The solvent was evaporated under vacuum and the resulting crude product was recrystallized from toluene to give the title compound as pale beige crystals (7.41 g, 90%). $^1$H NMR (500 MHz, CDCl$_3$): 7.45 (4H, dd, J=5.2 and 3.2 Hz), 7.09 (4H, dd, J=5.0 and 3.5 Hz), 5.55 (2H, s).

Example 4

9,10-Dihydro-9,10-ethenoanthracene-11,12-dicarboxylic hydrazide (4). As shown in FIG. 2A, to a stirred refluxing mixture of hydrazine monohydrochloride (63 g, 0.92 mol) in glacial acetic acid (ca. 800 mL) is added crushed crystals of the dicarboxylic anhydride 3 (27.4 g, 0.1 mol). A yellow color develops upon addition of the anhydride to the refluxing mixture. The mixture is allowed to reflux overnight (ca. 16 h), during which period it evolves into a colorless solution. The mixture is cooled down and then added to a large volume of water (ca. 3000 mL). The resulting white precipitates are filtered, washed with copious volumes of water, air-dried and finally dried under vacuum for several hours to yield the title compound as a white solid (28.8 g, 100%). $^1$H NMR (300 MHz, DMSO-d$_6$): 11.8 (2H, br), 7.52 (4H, dd, J=5.1 and 3.3 Hz), 7.04 (4H, dd, J=5.5 and 3.2 Hz), 5.84 (2H, s). $^{13}$C NMR (75 MHz, DMSO-d$_6$): 144.0, 125.4, 124.4, 47.3 (amide C unseen).

Example 5

1,4-dichloro-9,10-dihydro-9,10[1',2']benzeno-2,3-diazaanthracene (5a). As shown in FIG. 2A, a mixture of the dicarboxylic hydrazide 4 (6.0 g, 20.8 mmol) and phosohorus oxychloride (125 mL) was refluxed overnight (ca. 16 h) under a nitrogen atmosphere. The mixture was then cooled to room temperature and the excess POCl$_3$ was evaporated under vacuum. The residue was dissolved in dichloromethane (ca. 200 mL) and a few grams of neutral alumina were added to the solution. After stirring at room temperature for ca. 1 h, the dichloromethane solution was filtered on a short neutral alumina plug, and the alumina was washed/eluted with several copious portions of ethyl acetate. The combined solvent fractions were evaporated under vacuum to yield the title compound as an off-white solid (5.8 g, 86%). Analytical samples were obtained after recrystallization from di-n-butyl ether. $^1$H NMR (300 MHz, CDCl$_3$): 7.53 (4H, dd, J=5.4 and 3.2 Hz), 7.13 (4H, dd, J=5.4 and 3.2 Hz), 5.84 (2H, s). $^{13}$C NMR (75 MHz, CDCl$_3$): 151.5, 147.4, 142.0, 126.8, 125.2, 50.4. HR-MS (EI) calcd for C$_{18}$H$_{10}$Cl$_2$N$_2$: 324.0216, found: 324.0219.

Example 6

1,4-dibromo-9,10-dihydro-9,10[1',2']benzeno-2,3-diazaanthracene (5b). As shown in FIG. 2A, a mixture of the dicarboxylic hydrazide 4 (288 mg, 1.0 mmol) and phosohorus oxybromide (861 mg, 3.0 mmol) was stirred overnight (ca. 16 h) at 80° C. under a nitrogen atmosphere. The mixture was then cooled to room temperature residue is dissolved in dichloromethane (ca. 40 mL) and a few hundred milligrams of neutral alumina are added to the solution. After stirring at room temperature for ca. 1 h, the dichloromethane solution is filtered on a neutral alumina plug, and the alumina is rinsed with several copious portions of ethyl acetate. The combined solvent fractions are evaporated under vacuum to yield the title compound as a an off-white solid (334 g, 81%). Analytical samples may be obtained after recrystallization from di-n-butyl ether. $^1$H NMR (500 MHz, CDCl$_3$): 7.55 (4H, dd, J=5.2 and 3.2 Hz), 7.15 (4H, dd, J=5.6 and 3.2 Hz), 5.81 (2H, s). $^{13}$C NMR (125 MHz, CDCl$_3$): 149.2, 144.4, 141.9, 126.7, 125.1, 52.5. HR-MS (EI) calcd for C$_{18}$H$_{10}$Br$_2$N$_2$: 411.9205, found: 411.9207.

Example 7

1,4-dibromo-9,10-dihydro-9,10 [1',2']benzeno-2,3-diazaanthracene (5b—alternate preparation). A suspension of the dicarboxylic hydrazide 4 (288 mg, 1.0 mmol), phosphorus pentoxide (710 mg, 5.0 mmol), tetra-n-butylammonium bromide (966 mg, 3.0 mmol) in dry toluene (10 mL) is refluxed overnight (ca. 16 h) under a nitrogen atmosphere. The mixture was then cooled down, and the toluene was decanted off the gummy residue. The residue was washed with several portions of toluene, and the combined toluene fractions were washed with aqueous sodium bicarbonate, then aqueous sodium chloride, and dried over anhydrous magnesium sulfate. Evaporation of the solvent under vacuum yields the title compound as a pale beige solid (273 mg, 66%).

Example 8

Poly(aryl ether) 6. As shown in FIG. 3, dichloride 5a (65.0 mg, 0.20 mmol), previously recrystallized from di-n-butyl ether, triprycene hydroquinone (57.2 mg, 0.20 mmol), previously recrystallized from acetic acid, and anhydrous potassium carbonate (30 mg, 0.22 mmol) were added to a septum-scealed 20 mL Schlenk tube equipped with a magnetic stirrer. The vessel was then evacuated under vacuum and back-filled with argon 5 times. Dimethylacetamide (2 mL, dried over anhydrous potassium carbonate) was then syringed in, and the mixture was submitted to three freeze-thaw cycles. The mixture was then stirred at 170° C. for 72 hours, during which period a yellowish tint develops and heavy white precipitates coat the sides of the Schlenk tube. After the 72 hours heating period, a few drops of acetic anhydride were added to end-cap the polymer chains and the mixture was let to cool down to room temperature. The contents of the vessel were poured in ca. 45 mL of water-methanol (1:1 v/v), and the precipitates were collected by centrifugation. The off-white solid was then submitted to sequential solid-liquid extractions in a Soxhlet apparatus. Extraction for ca. 16 h with methanol, then for ca. 16 h with acetone was performed to remove oligomers and side-products. Extraction with chloroform for ca. 16 h yielded a polymer fraction that was isolated by evaporation of the chloroform under vacuum, redissolution is a minimum volume of dichloromethane and reprecipitation from methanol (ca. 50 mL). The precipitates were centrifuged out and dried under vacuum to yield the greyish-white polymer 6 (46 mg, 43%). GPC (THF): Mn=5700, Mw=11000. $^1$H NMR (300 MHz, CDCl$_3$): 7.46 (4H, br), 7.14 (4H, br), 7.03 (4H, br), 6.85 (4H, br), 6.59 (2H, s), 5.84 (2H, s), 5.67 (2H, s).

Example 9

General procedure for 1,4-diaryl-9,10-dihydro-9,10[1',2'] benzeno-2,3-diazaanthracene. (7a-d) As shown in FIG. 4, dihalide 5 (0.33 mmol), tetrakis(triphenylphosphine) palladium(0) (0.017 mmol), anhydrous cesium fluoride (1.33 mmol), and the required aryl stannane, aryl boronate or arylboronic acid (1.00 mmol) were introduced in a 20 mL septum-capped Schlenk tube equipped with a magnetic stirrer. The vessel was evacuated and back-filled with argon 5 times, and dry, degassed p-dioxane (2 mL) was syringed in. The vessel was again quickly evacuated and back-filled with argon 5 times, and then scealed. The mixture was stirred at 100-110° C. for 48 hours, and cooled down to room temperature. Contents were then filtered on a short silica gel plug and washed with copious volumes of ethyl acetate. Evaporation of the solvents under vacuum yields the crude products 7a-d.

Example 10

1,4-diphenyl-9,10-dihydro-9,10[1',2']benzeno-2,3-diazaanthracene. (7a) The title compound was synthesized using the general procedure in Example 9, using dichloride 5a (325 mg, 1.0 mmol), trimethylphenyltin (723 mg, 3.0 mmol), Pd(PPh$_3$)$_4$ (58 mg, 0.05 mmol) and CsF (608 mg, 4.0 mmol) in p-dioxane (6 mL). The crude product was purified by trituration in hexanes, and was collected by filtration and vacuum-dried to yield the title compound as a white solid (220 mg, 54%).

Alternatively, the title compound was synthesized using the general procedure in Example 9, using dichloride 5a (108 mg, 0.33 mmol), phenylboronic acid (122 mg, 1.0 mmol), Pd$_2$(dba)$_3$ (5 mg, 0.005 mmol), tBu$_3$P.HBF$_4$ (6 mg, 0.020 mmol) and CsF (202 mg, 1.33 mmol) in p-dioxane (2 mL). The crude product is purified by trituration in hexanes, and is collected by filtration and vacuum-dried to yield the title compound as a white solid (113 mg, 83%).

$^1$H NMR (400 MHz, CDCl$_3$): 7.81 (4H, m), 7.67 (6H, m), 7.47 (4H, m), 7.11 (4H, m), 5.93 (2H, s).

Example 11

1,4-di(2-thienyl)-9,10-dihydro-9,10[1',2']benzeno-2,3-diazaanthracene. (7b) The title compound was synthesized using the general procedure in Example 9, using dichloride 5a (325 mg, 1.0 mmol), 2-tributylstannylthiophene (1119 mg, 3.0 mmol), Pd(PPh$_3$)$_4$ (58 mg, 0.05 mmol) and CsF (608 mg, 4.0 mmol) in p-dioxane (6 mL). The crude product was purified by trituration in hexanes, and was collected by filtration and vacuum-dried to yield the title compound as a white solid (397 mg, 95%). $^1$H NMR (500 MHz, CDCl$_3$): 7.78 (2H, d, J=2.9 Hz), 7.62 (2H, d, J=5.0 Hz), 7.52 (4H, dd, J=5.3 and 3.3 Hz), 7.33 (2H, dd, J=5.0 and 3.7 Hz), 7.11 (4H, dd, J=5.4 and 3.1 Hz), 6.27 (2H, s).

Example 12

1,4-di(2,2'-bithienyl)-9,10-dihydro-9,10[1',2']benzeno-2,3-diazaanthracene. (7d) The title compound was synthesized using the general procedure in Example 9, using dichloride 5a (108 mg, 0.33 mmol), 5-tributylstannyl-2,2'-bithiophene (455 mg, 1.0 mmol), Pd(PPh$_3$)$_4$ (20 mg, 0.017 mmol) and CsF (202 mg, 1.3 mmol) in p-dioxane (2 mL). The crude product was purified by column chromatography on silica gel using a gradient mobile phase using 25/75 v/v dichloromethane/hexanes as the initial eluent and pure dichloromethane as the final eluent. Evaporation of the solvents under vacuum afforded the title compound as a yellow-greenish solid that fluoresces greenish-blue light under UV irradiation (168 mg, 86%). $^1$H NMR (500 MHz, CDCl$_3$): 7.72 (2H, d, J=3.7 Hz), 7.55 (4H, dd, J=5.0 and 3.2 Hz), 7.38 (2H, d, J=3.7 Hz), 7.36 (2H, d, J=3.2 Hz), 7.31 (2H, d, J=4.9 Hz), 7.13 (4H, dd, J=5.2 and 3.1 Hz), 7.10 (2H, dd, J=5.0 and 3.7 Hz), 6.29 (2H, s). $^{13}$C NMR (125 MHz, CDCl$_3$): 148.8, 143.0, 142.7, 140.9, 138.1, 137.0, 129.2, 128.3, 126.5, 125.5, 124.9, 124.8, 124.5, 49.6.

Example 13

1-chloro-4-methoxy-9,10-dihydro-9,10[1',2']benzeno-2,3-diazaanthracene (8). As shown in FIG. 5, in a septum-capped Schlenk flask was placed dichloride 5a (975 mg, 3.0 mmol). The flask was evacuated and back-filled with argon 5 times, and dry tetrahydrofuran (ca. 20 mL) was then added by cannula. The resulting solution was then transferred by cannula to a second septum-capped Schlenk flask containing a freshly prepared solution of sodium methoxide in methanol, made from sodium metal (76 mg, 3.3 mmol) and methanol (5 mL) under an argon atmosphere. The resulting mixture was allowed to stir at room temperature overnight (ca. 16 h), during which period the solution became a cloudy white suspension. The reaction mixture was then quenched by the addition of saturated aqueous sodium bicarbonate (ca. 50 mL). The organic phase was separated, and the aqueous layer was extracted with two portions of ethyl acetate (ca. 25 mL). The combined organic phases were then washed with saturated aqueous sodium chloride, dried over anhydrous magnesium sulfate, and filtered. Evaporation of the solvents under vacuum yielded a fluffly white solid. Purification of the crude white product by column chromatography on silica gel using 50/50 v/v dichloromethane/hexanes as the mobile phase followed by evaporation of the solvents in vacuo yielded the title compound as a pure, fluffy, white solid (556 mg, 58%). $^1$H NMR (500 MHz, CDCl$_3$): 7.49 (4H, m), 7.08 (4H, m), 7.38 (2H, d, J=3.7 Hz), 5.79 (1H, s), 5.78 (1H, s), 4.17 (3H, s). $^{13}$C NMR (125 MHz, CDCl$_3$): 160.7, 147.7, 147.5, 143.1, 143.0, 138.1, 126.2, 126.1, 124.9, 124.8, 55.4, 50.5, 47.2.

Example 14

General procedure for 1-aryl-4-methoxy-9,10-dihydro-9,10[1',2']benzeno-2,3-diazaanthracene (9), as exemplified for 1-phenyl-4-methoxy-9,10-dihydro-9,10[1',2']benzeno-2,3-diazaanthracene (9a). As shown in FIG. 5, chloride 8 (300 mg, 0.94 mmol), tetrakis(triphenylphosphine) palladium(0) (58 mg, 0.05 mmol), anhydrous cesium fluoride (456 mg, 3.00 mmol), and phenylboronic acid (244 mg, 2.00 mmol) were placed in a 20 mL septum-capped Schlenk tube equipped with a magnetic stirrer. The vessel was evacuated and back-filled with argon 5 times, and dry, degassed p-dioxane (2 mL) was added to the vessel using a syringe. The vessel was again quickly evacuated and back-filled with argon 5 times, and then sealed. The mixture was stirred at 100-110° C. for 48 hours and cooled down to room temperature. The contents of the vessel were then filtered on a short silica gel plug and washed with copious volumes of ethyl acetate. Evaporation of the solvents under vacuum yielded a pale cream-colored crude product consisting mainly of the title compound and unreacted, excess phenylboronic acid. The crude product was purified by column chromatography on silica gel using 25/75 v/v ethyl acetate/hexanes as the mobile phase. Evaporation of the solvent yielded the title compound as a pure, white solid (223 mg, 66%). $^1$H NMR (300 MHz, CDCl$_3$): 7.70 (2H, m), 7.60 (3H, m), 7.52 (2H, m), 7.40 (2H, m), 7.07 (2H, m) 5.90 (1H, s), 5.81 (1H, s), 4.24 (3H, s).

Example 15

General procedure for pi-conjugated polymers comprising the 9,10-dihydro-9,10[1',2']benzeno-2,3-diazaanthracene-1,4-diyl subunit. (10a-c) As shown in FIG. 6, dihalide 5 (0.10 mmol), tetrakis(triphenylphosphine) palladium(0) (0.005 mmol), anhydrous cesium fluoride (0.30 mmol), bis(stannane), and bis(boronate) or bis(boronic acid) (0.10 mmol) were introduced in a 20 mL septum-capped Schlenk tube equipped with a magnetic stirrer. The vessel was evacuated and back-filled with argon 5 times, and dry, degassed solvent (2 mL) was added via syringe. The vessel was again quickly evacuated and back-filled with argon 5 times, and then sealed. The mixture was stirred at 100-110° C. for 48 hours, and cooled down to room temperature. The contents of the vessel were then poured in methanol (ca. 50 mL) and the polymers were isolated by centrifugation followed by drying under vacuum for several hours.

Example 16

Polymer 10a. The title compound was synthesized using the general procedure in Example 15, using dichloride 5a (32.5 mg, 0.1 mmol), 5,5'-bis(trimethylstannyl)-2,2'-bithiophene (49.2 mg, 0.1 mmol), Pd(PPh$_3$)$_4$ (6 mg, 0.005 mmol) and CsF (46 mg, 0.3 mmol) in toluene (2 mL). Polymer 10a was obtained as an orange solid (37 mg, 88%). GPC (THF—only marginally soluble): M$_n$=2600, M$_w$=3200. $^1$H NMR (300 MHz, CDCl$_3$): 7.81 (2H, m), 7.50-7.65 (6H, m), 7.16 (4H, m), 6.33 (2H, br). Fluorescence: $\lambda_{max,ex,chcl3}$=415 nm, $\lambda_{max,em,chcl3}$=496 nm, $\lambda_{max,ex,film}$=428 nm, $\lambda_{max,em,film}$=573 nm.

Example 17

Polymer 10b. The title compound was synthesized using the general procedure in Example 15, using dichloride 5a (65.0 mg, 0.2 mmol), E-1,2-bis(tri-n-butylstannyl)ethylene (121.2 mg, 0.2 mmol), Pd(PPh$_3$)$_4$ (12 mg, 0.010 mmol) and CsF (92 mg, 0.6 mmol) in p-dioxane (2 mL). Polymer 10b was obtained as a light yellow solid (55 mg, 98%). GPC (THF—only marginally soluble): M$_n$=1600, M$_w$=2100. The polymer had limited solubility, preventing adequate $^1$H-NMR characterization. Also, the polymer was non-fluorescent. $\lambda_{max,abs,thf}$=400 nm.

Example 18

Polymer 10c. The title compound was synthesized using the general procedure in Example 15, using dichloride 5a (65.0 mg, 0.2 mmol), bis(trimethylstannyl)acetylene (70.2 mg, 0.2 mmol), Pd(PPh$_3$)$_4$ (12 mg, 0.010 mmol) and CsF (92 mg, 0.6 mmol) in p-dioxane (2 mL). Polymer 10c was obtained as maroon-brown solid (44 mg, 79%). GPC (THF—only marginally soluble): M$_n$=2000, M$_w$=2900. The solubility of this polymer is too limited for an adequate $^1$H-NMR characterisation. Also, the polymer was non-fluorescent. $\lambda_{max,abs,thf}$=432 nm.

What is claimed is:

1. A composition, comprising:
   a polymer comprising a shape-persistent molecule having at least 20% free volume, wherein the shape-persistent molecule comprises a 5-membered, 6-membered, or 7-membered heteroaromatic ring comprising at least two heteroatom ring atoms, the polymer further comprising a metal, wherein the metal forms a bond with a heteroatom on a monomeric unit and wherein the polymer is substantially non-fluorescent in the visible region.

2. A composition as in claim 1, wherein shape-persistent molecule comprises an iptycene.

3. A composition as in claim 1, wherein the polymer comprises a first monomeric unit that forms a hydrogen bond with a second monomeric unit.

4. A composition as in claim 3, wherein the hydrogen bond causes at least a portion of the polymer to adopt a planar structure.

5. A composition as in claim 1, further comprising a metal, wherein the metal forms a first bond with a heteroatom on a first monomeric unit and a second bond with a second monomeric unit, wherein the second monomeric unit is adjacent to the first monomeric unit.

6. A composition as in claim 1, arranged as a dielectric material in an electronic component.

7. A composition as in claim 1 which, in a solid state, has dielectric constant of about 3.0 or less.

8. A composition as in claim 1, wherein the polymer has a structure comprising the formula,

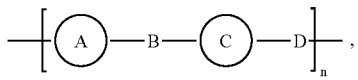

wherein A and C can be the same or different and each comprises an aromatic group; B and D can be absent, heteroatom, alkene, alkyne, or substituted derivatives thereof; and n is less than about 10,000.

9. A composition as in claim 8, wherein at least one of A and C comprises an iptycene moiety.

10. A composition as in claim 8, wherein at least one of A and C comprises an iptycene and B and D are oxygen.

11. A composition as in claim 8, wherein A, B, C and D are optionally substituted with R, and R can be hydrogen, halide, alkyl, heteroalkyl, aryl, heteroaryl, alkenyl, heteroalkenyl, alkynyl, heteroalkynyl, alkoxy, aryloxy, aryl, cyano, nitro, hydroxyl, a carbonyl group, or substituted derivatives thereof.

12. A composition as in claim 8, wherein the polymer has a structure,

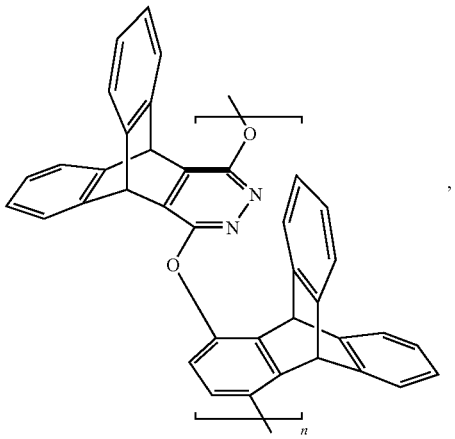

further comprising a metal.

13. A composition as in claim 8, wherein the polymer comprises a monomeric unit having the structure,

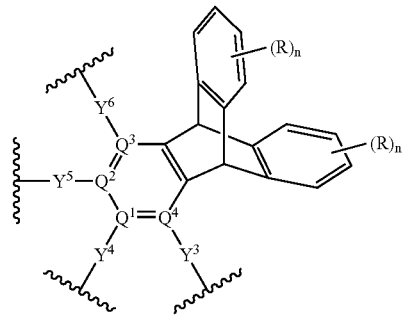

wherein $Q^1$, $Q^2$, $Q^3$, and $Q^4$ can be the same or different and are selected from among carbon, heteroatom, or substituted derivatives thereof; $Y^3$, $Y^4$, $Y^5$, and $Y^6$ can be absent, alkyl, heteroalkyl, alkenyl, heteroalkenyl, alkynyl, heteroalkynyl, aryl, heteroaryl, aralkyl, heteroaralkyl, heteroatom, or substituted derivatives thereof; each R can be the same or different and can be selected from among halide, alkyl, heteroalkyl, aryl, heteroaryl, alkenyl, heteroalkenyl, alkynyl, heteroalkynyl, alkoxy, aryloxy, aryl, cyano, nitro, hydroxyl, a carbonyl group, or substituted derivatives thereof; and n can be 0, 1, 2, 3, or 4.

14. A composition as in claim 13, wherein the polymer comprises the structure,

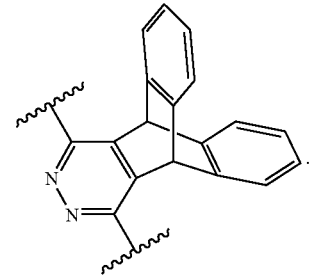

15. A composition as in claim 1, comprising a shape persistent molecule containing bridgehead atoms, with molecular structures radiating from the bridgehead atoms in three directions and extending outwardly therefrom such that each defines a van der Waals contact of furthest point from the bridgehead atoms of no less than 3.5 Å.

16. A composition as in claim 1, having an average molecular weight greater than 2000 daltons.

* * * * *